(12) United States Patent
Iwakura et al.

(10) Patent No.: US 10,948,288 B2
(45) Date of Patent: Mar. 16, 2021

(54) IMAGE PICKUP SYSTEM WITH OVERLAP AND NON-OVERLAP EXPOSURE PERIOD

(71) Applicant: CANON KABUSHIKI KAISHA, Tokyo (JP)

(72) Inventors: Yasushi Iwakura, Kawaguchi (JP); Tomoya Onishi, Ayase (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 15/727,377

(22) Filed: Oct. 6, 2017

(65) Prior Publication Data

US 2018/0106613 A1 Apr. 19, 2018

(30) Foreign Application Priority Data

Oct. 15, 2016 (JP) .............................. JP2016-203167

(51) Int. Cl.
*G01C 3/14* (2006.01)
*H04N 13/239* (2018.01)
(Continued)

(52) U.S. Cl.
CPC ............... *G01C 3/14* (2013.01); *B60R 1/00* (2013.01); *B60R 21/0132* (2013.01); *G01C 11/02* (2013.01); *G01S 13/931* (2013.01); *G06K 9/00791* (2013.01); *G06K 9/209* (2013.01); *G06K 9/34* (2013.01); *H04N 5/232* (2013.01); *H04N 5/235* (2013.01);
(Continued)

(58) Field of Classification Search
CPC ........ G01C 3/14; G01C 11/02; H04N 5/2357; H04N 5/2356; H04N 5/232; H04N 13/144; H04N 5/2355; H04N 5/235; H04N 5/2353; H04N 13/239; H04N 2013/0081; G01S 13/931; G06K 9/34; G06K 9/00791; G06K 9/209; B60R 21/0132; B60R 1/00
See application file for complete search history.

(56) References Cited

U.S. PATENT DOCUMENTS 7,773,140 B2 8/2010 Nakano et al.
9,240,837 B2 1/2016 Sleator
(Continued)

FOREIGN PATENT DOCUMENTS

CN 101137013 A 3/2008
CN 101450646 A 6/2009
(Continued)

*Primary Examiner* — Richard T Torrente
(74) *Attorney, Agent, or Firm* — Canon U.S.A., Inc. I.P. Division

(57) ABSTRACT

At least one image pickup system that acquires distance information and prevents missing, or loss of, information while taking countermeasures against flicker, includes a first image pickup apparatus, a second image pickup apparatus, and a signal processing unit configured to process signals acquired from the first image pickup apparatus and the second image pickup apparatus. An exposure period of the first image pickup apparatus and an exposure period of the second image pickup apparatus are repeated a plurality of times in one frame. The exposure period of the first image pickup apparatus is overlapped with a non-exposure period of the second image pickup apparatus, and a non-exposure period of the first image pickup apparatus is overlapped with the exposure period of the second image pickup apparatus.

13 Claims, 15 Drawing Sheets

(51) Int. Cl.
- *B60R 1/00* (2006.01)
- *H04N 5/235* (2006.01)
- *G01S 13/931* (2020.01)
- *H04N 5/232* (2006.01)
- *B60R 21/0132* (2006.01)
- *H04N 13/144* (2018.01)
- *G01C 11/02* (2006.01)
- *G06K 9/00* (2006.01)
- *G06K 9/20* (2006.01)
- *G06K 9/34* (2006.01)
- *H04N 13/00* (2018.01)

(52) U.S. Cl.
CPC ......... *H04N 5/2353* (2013.01); *H04N 5/2355* (2013.01); *H04N 5/2356* (2013.01); *H04N 5/2357* (2013.01); *H04N 5/23206* (2013.01); *H04N 13/144* (2018.05); *H04N 13/239* (2018.05); *H04N 2013/0081* (2013.01)

(56) References Cited

U.S. PATENT DOCUMENTS

| | | | |
|---|---|---|---|
| 2008/0211941 A1* | 9/2008 | Deever | H04N 5/2353 348/262 |
| 2012/0127345 A1 | 5/2012 | Matsunaga | |
| 2015/0341619 A1* | 11/2015 | Meir | G01S 17/87 348/47 |
| 2016/0170487 A1* | 6/2016 | Saisho | B60K 35/00 345/156 |
| 2016/0191159 A1* | 6/2016 | Aoyama | H04B 10/116 398/172 |

FOREIGN PATENT DOCUMENTS

| | | |
|---|---|---|
| CN | 104284083 A | 1/2015 |
| JP | 2002-258358 A | 9/2002 |
| JP | 2004-135074 A | 4/2004 |
| JP | 2008-252401 A | 10/2008 |
| JP | 2009-165081 A | 7/2009 |
| WO | 2014/077047 A1 | 5/2014 |

\* cited by examiner

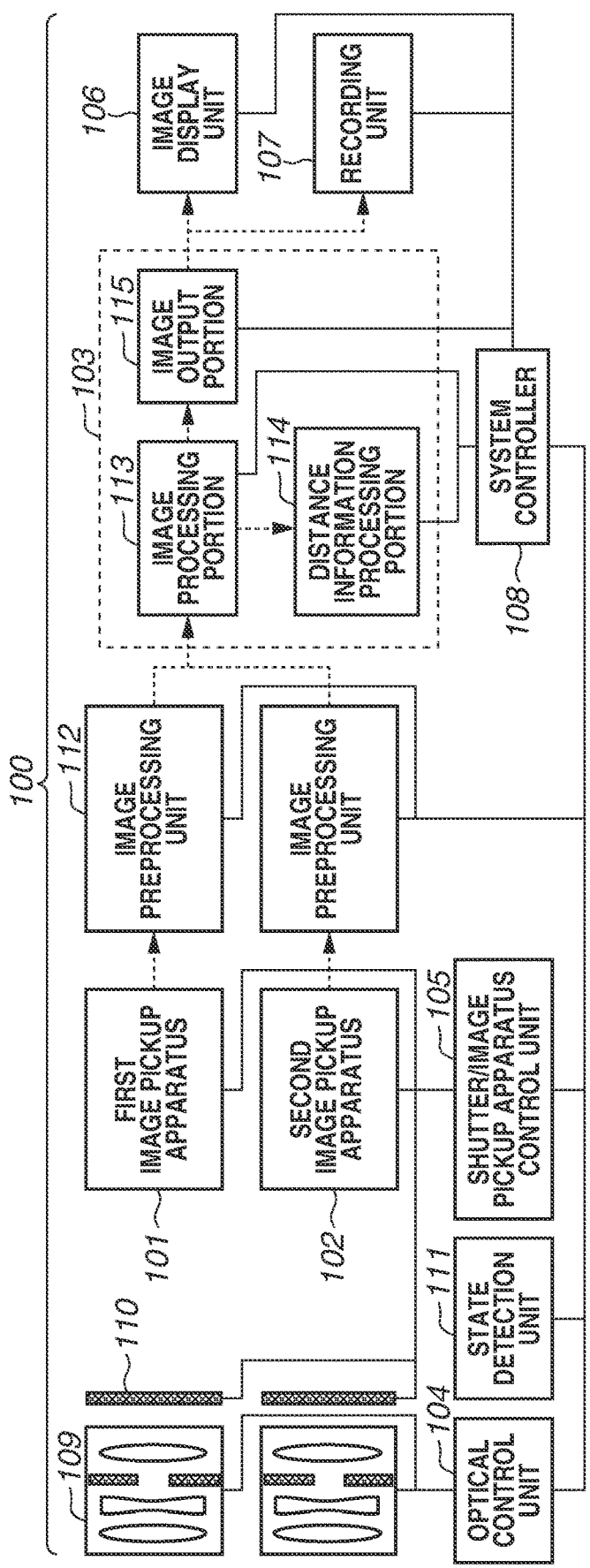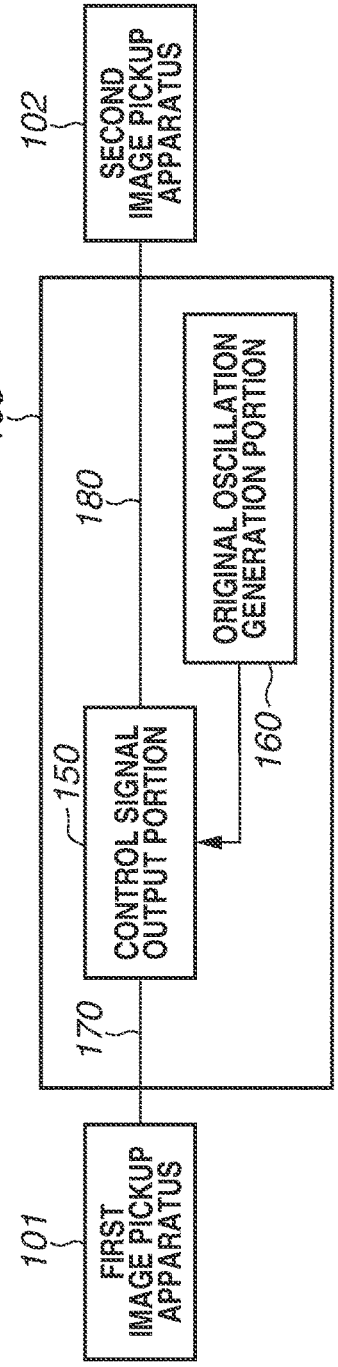

IMAGE PICKUP SYSTEM WITH OVERLAP AND NON-OVERLAP EXPOSURE PERIOD

BACKGROUND OF THE INVENTION

Field of the Invention

The present disclosure relates to one or more embodiments of an image pickup system.

Description of the Related Art

A stereo focusing technology that picks up images of an object as a measurement objective with use of two cameras (a stereo camera) different in point of view, and measures a distance to the object with use of the acquired two images, has been known. The stereo camera uses parallax that occurs between the two picked-up images to measure the distance to the object, based on the principle of triangulation. Using the stereo camera makes it possible to measure a distance between a position of the camera and a photographic subject such as a person and an object located in front of the camera. Therefore, the stereo camera is also used as an on-vehicle camera for the purpose of automatic traveling and accident avoidance.

Japanese Patent Application Laid-Open No. 2009-165081 discusses an on-vehicle stereo camera that picks up an image of a photographic subject even under a light emitting device (for example, a light emitting diode (LED)) that repeats blinking and luminance variation caused by AC power supply drive or the like. More specifically, Japanese Patent Application Laid-Open No. 2009-165081 discusses the on-vehicle stereo camera provided with countermeasures against flicker by making an exposure period of a first image pickup apparatus or a second image pickup apparatus longer than a blinking cycle of the light emitting device. In addition, Japanese Patent Application Laid-Open No. 2009-165081 discusses that a signal acquired from the second image pickup apparatus is used for confirmation of the light emitting device by making the exposure period of the second image pickup apparatus longer than the exposure period of the first image pickup apparatus.

As described above, Japanese Patent Application Laid-Open No. 2009-165081 discusses that a start point of the exposure period of the second image pickup apparatus is set earlier than a start point of the exposure period of the first image pickup apparatus to make the exposure time of the second image pickup apparatus longer than the exposure time of the first image pickup apparatus, for countermeasures against flicker.

In Japanese Patent Application Laid-Open No. 2009-165081, however, an end point of the exposure period of the second image pickup apparatus is coincident with an end point of the exposure period of the first image pickup apparatus. Therefore, if the light emitting device emits light before the exposure period of the first or second image pickup apparatus in next frame starts, image capturing cannot be performed in such a state, which causes missing information.

SUMMARY OF THE INVENTION

The present disclosure is directed to at least one or more embodiments of an image pickup system that makes it possible to acquire distance information and prevent missing, or loss of, information while taking countermeasures against flicker.

An image pickup system according to at least one embodiment of the present disclosure includes a first image pickup apparatus, a second image pickup apparatus, and a signal processing unit configured to process signals acquired from the first image pickup apparatus and the second image pickup apparatus, wherein an exposure period of the first image pickup apparatus and an exposure period of the second image pickup apparatus are repeated a plurality of times in one frame, the exposure period of the first image pickup apparatus is overlapped with a non-exposure period of the second image pickup apparatus, and a non-exposure period of the first image pickup apparatus is overlapped with the exposure period of the second image pickup apparatus.

According to other aspects of the present disclosure, one or more additional image pickup systems, one or more control or driving methods, at least one moving body and one or more recording units or storage mediums (e.g., non-transitory storage medium(s)) for use therewith are discussed herein. Further features of the present disclosure will become apparent from the following description of exemplary embodiments with reference to the attached drawings.

BRIEF DESCRIPTION OF THE DRAWINGS

FIGS. 1A and 1B are block diagrams each illustrating an image pickup system according to at least a first exemplary embodiment.

DESCRIPTION OF THE EMBODIMENTS

Figure 2:
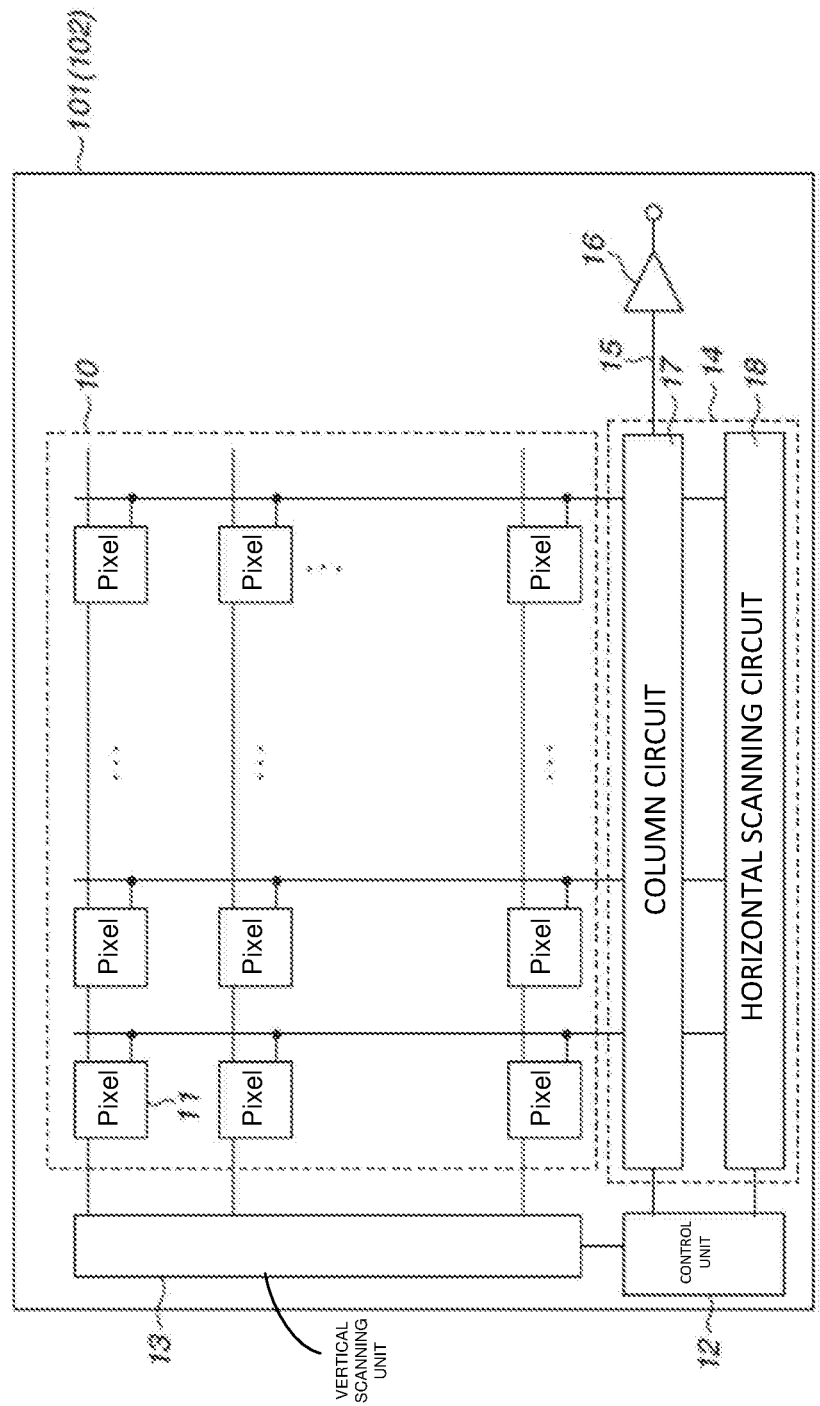
FIG. 2 is a block diagram illustrating an image pickup apparatus according to at least the first exemplary embodiment.

Specific exemplary embodiments of an image pickup system according to the present disclosure are described with reference to drawings. Note that, in the following description and drawings, common components are denoted by common reference numerals and description thereof is appropriately omitted. At least one configuration and at least one driving method of an image pickup system according to a first exemplary embodiment of the present disclosure are described with reference to FIGS. 1 to 5.

(Block Diagram of Image Pickup System)

FIG. 1A is a block diagram of the image pickup system 100 according to at least the first exemplary embodiment. An image pickup system 100 includes an image pickup apparatus 101 (a first image pickup apparatus) and an image pickup apparatus 102 (a second image pickup apparatus). The image pickup system 100 further includes a signal processing unit 103, an optical control unit 104, a shutter/image pickup apparatus control unit 105, an image display unit 106, a recording unit 107, and a system controller 108. An optical unit 109 and a mechanical shutter 110 are disposed on light incident surface side of each of the image pickup apparatuses 101 and 102, and an image preprocessing unit 112 is disposed in a following stage of each of the image pickup apparatuses 101 and 102.

Each of the image pickup apparatuses 101 and 102 converts light that is received through the optical unit 109 and the mechanical shutter 110, into an electric signal. Further, the converted electric signal is processed by the image preprocessing unit 112. An amount of the light applied to the image pickup apparatuses 101 and 012 is determined by the system controller 108, based on an input value to the optical unit 109 and the mechanical shutter 110, and optical signal intensity measured by the image pickup apparatuses 101 and 102 and a state detection unit 111. In a case where the system controller 108 determines that the amount of light applied to the image pickup apparatuses 101 and 102 is out of a proper range, an aperture value of the optical unit 109 and operation of the mechanical shutter 110 are adjusted through the optical control unit 104 and the shutter/image pickup apparatus control unit 105. The aperture value of the optical unit 109 and the operation of the mechanical shutter 110 is not necessary adjusted automatically but may be adjusted manually.

The shutter/image pickup apparatus control unit 105 synchronizes operations of the two image pickup apparatuses 101 and 102 and the mechanical shutters 110. More specifically, the shutter/image pickup apparatus control unit 105 generates a synchronization signal that synchronizes operation of the mechanical shutter 110 of the first image pickup apparatus 101 and operation of the mechanical shutter 110 of the second image pickup apparatus 102, a signal that controls timing relating to generation and output of an image signal, and other signals.

The mechanical shutter 110 includes, for example, a leading blade and a trailing blade that shield light, and the blades travel in a row direction. Further, an opening/closing period of the shutter is controlled by the shutter/image pickup apparatus control unit 105.

The image preprocessing unit 112 performs processing such as horizontal/vertical synchronization and encoding on the electric signal acquired from the image pickup apparatus 101 or 102, and transmits the processed signal as an image signal to the signal processing unit 103 in the following stage.

The signal processing unit 103 includes an image processing portion 113, a distance information processing portion 114, and an image output portion 115.

The image processing portion 113 acquires the respective image signals of the image pickup apparatuses 101 and 102 from the image preprocessing units 112. The image processing portion 113 then performs processing such as temporal storage of the image, correction of brightness and contrast of the image, image processing of profile extraction, partial clipping, synthesis, and distortion correction, and discrimination, identification, and recognition of a photographic subject.

The distance information processing portion 114 performs processing of parallax and focusing calculation with the photographic subject, based on a processing result of the image processing portion 113.

The image output portion 115 performs processing to generate a signal that is suitably outputted to the image display unit 106 and the recording unit 107, based on the processing result of the image processing portion 113, and outputs the signal.

FIG. 1B is a diagram illustrating an example of the shutter/image pickup apparatus control unit 105 in detail. The shutter/image pickup apparatus control unit 105 includes an original oscillation generation portion 160 and a control signal output portion 150. The original oscillation generation portion 160 performs generation of a periodic signal and the like. The control signal output portion 150 outputs control signals to control the first image pickup apparatus 101 and the second image pickup apparatus 102. A wiring 170 is a wiring electrically connecting the control signal output portion 150 and the first image pickup apparatus 101, and a wiring 180 is a wiring electrically connecting the control signal output portion 150 to the second image pickup apparatus 102. To synchronize the two image pickup apparatuses with high accuracy, the wiring 170 and the wiring 180 are substantially equal in length to each other. As used herein, "substantially equal in length" indicates not only the same length but also different lengths within a range achieving the effects of the first exemplary embodiment.

(Block Diagram of Image Pickup Apparatus)

FIG. 2 is a block diagram of the image pickup apparatus 101 or 102 provided in the image pickup system 100. The image pickup apparatus 102 has a configuration similar to the configuration of the image pickup apparatus 101.

The image pickup apparatus 101 or 102 includes an image pickup region 10 in which a plurality of pixels 11 are two-dimensionally arranged, a control unit 12, a vertical scanning unit 13, a pixel signal processing unit 14, and an output unit 16. The control unit 12, the vertical scanning unit 13, the pixel signal processing unit 14, and the output unit 16 are disposed on an outer periphery of the image pickup region 10.

The control unit 12 supplies a control signal and a power supply voltage to the vertical scanning unit 13, the pixel signal processing unit 14, and the output unit 16. The vertical scanning unit 13 supplies driving signals to the plurality of pixels 11 arranged in the image pickup region 10, on a pixel row basis or on a plurality of pixel rows basis. To synchronize the first image pickup apparatus 101 and the second image pickup apparatus 102 with high accuracy, the shutter/image pickup apparatus control unit 105 illustrated in FIG. 1 is electrically connected to the control unit 12.

The vertical scanning unit 13 includes a shift register or an address decoder.

The pixel signal processing unit 14 includes a column circuit 17, a horizontal scanning circuit 18, and a horizontal output line 15. The column circuit 17 includes a plurality of circuits. Examples of the plurality of circuits include a signal holding circuit, an amplification circuit, a noise reduction circuit, and an analog-to-digital conversion circuit. The horizontal scanning circuit 18 includes a shift register or an address decoder. The signal to be outputted to the horizontal output line 15 may be an analog signal or a digital signal.

The output unit 16 includes a buffer circuit, and transmits the signal that has been transmitted through the horizontal output line 15, to the image preprocessing unit 112 in the following stage of the image pickup apparatus 101 or 102.
(Equivalent Circuit Diagram of Pixel Portion)

Figure 3:
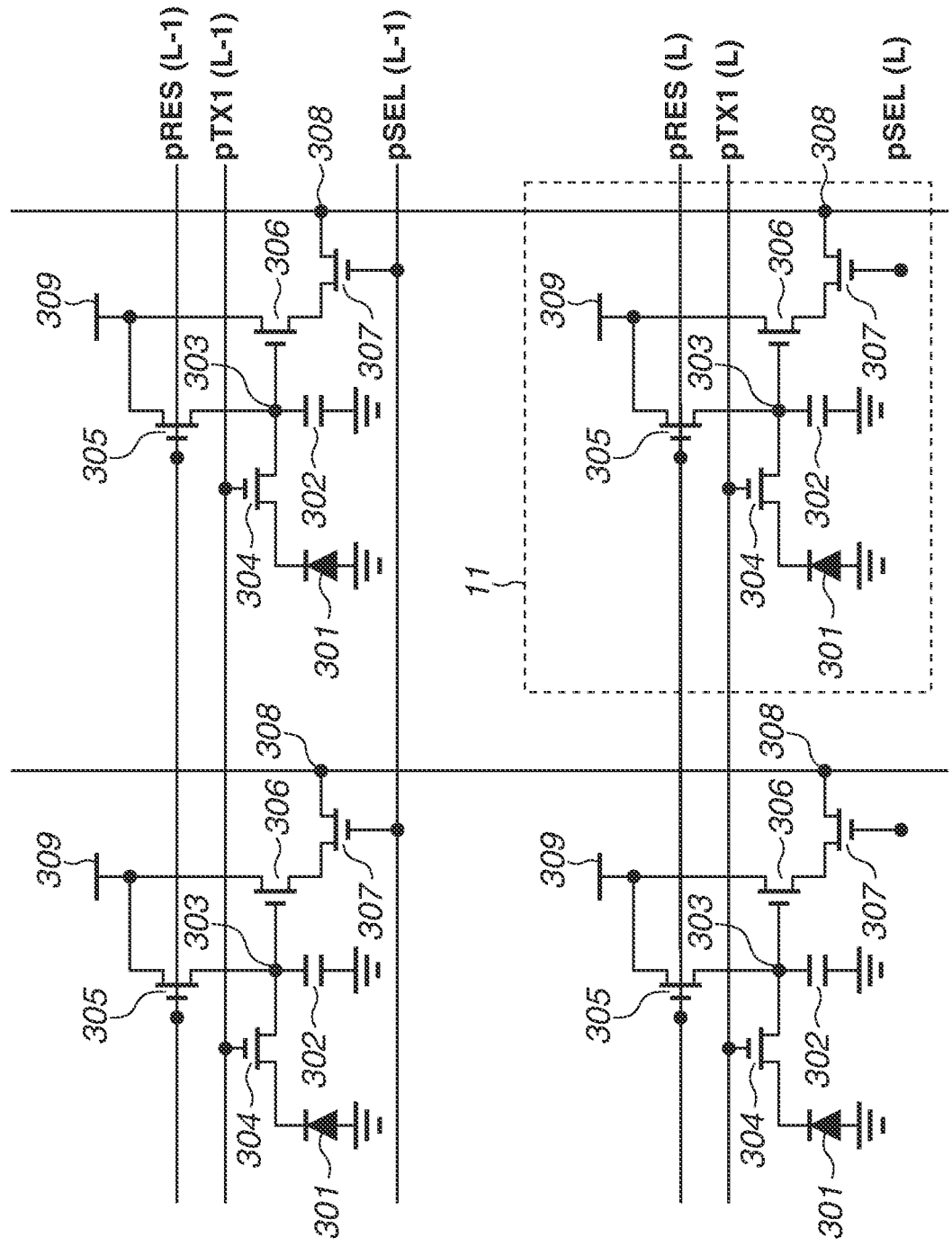
FIG. 3 is an equivalent circuit diagram of a pixel portion according to at least the first exemplary embodiment.

FIG. 3 illustrates a configuration of an equivalent circuit of the pixel 11 illustrated in FIG. 2. FIG. 3 illustrates an example including four pixels. The pixel 11 includes a photoelectric conversion portion 301, a floating diffusion 302 (FD 302), a transfer switch 304, an input node 303, a reset transistor 305, an amplification portion 306, and a selection transistor 307. The plurality of pixels 11 arranged in the same row are connected to same control lines pTX1, pRES, and pSEL that respectively operate or stop the transfer switches 304, the reset transistors 305, and the selection transistors 307 of the pixels in the same row concurrently.

The photoelectric conversion portion 301 generates electric charges in response to incident light, and accumulates the generated electric charges. The photoelectric conversion portion 301 is, for example, a photodiode.

The transfer switch 304 transfers, to the FD 302, the electric charges generated in the photoelectric conversion portion 301. The transfer switch 304 is controlled by a signal that is supplied through the control line pTX1. The transfer switch 304 is, for example, a metal-oxide semiconductor (MOS) transistor.

The FD 302 has a function of receiving and holding the electric charges generated in the photoelectric conversion portion 301 through the operation of the transfer switch 304, and configures the input node 303 of the amplification portion 306.

The amplification portion 306 amplifies the electric charges accumulated in the input node 303 of the amplification portion 306, and outputs the amplified electric charges as the pixel signal to the vertical output line 308. The amplification portion 306 is, for example, a source follower circuit.

The selection transistor 307 selects the pixel 11 that outputs the signal to the vertical output line 308.

The reset transistor 305 discharges, to a power supply 309, the electric charges in the input node 303 in response to the signal of the control line pRES to change a potential of the input node to a potential of the power supply 309, namely, performs reset operation.
(Timing Chart)

Figure 4:
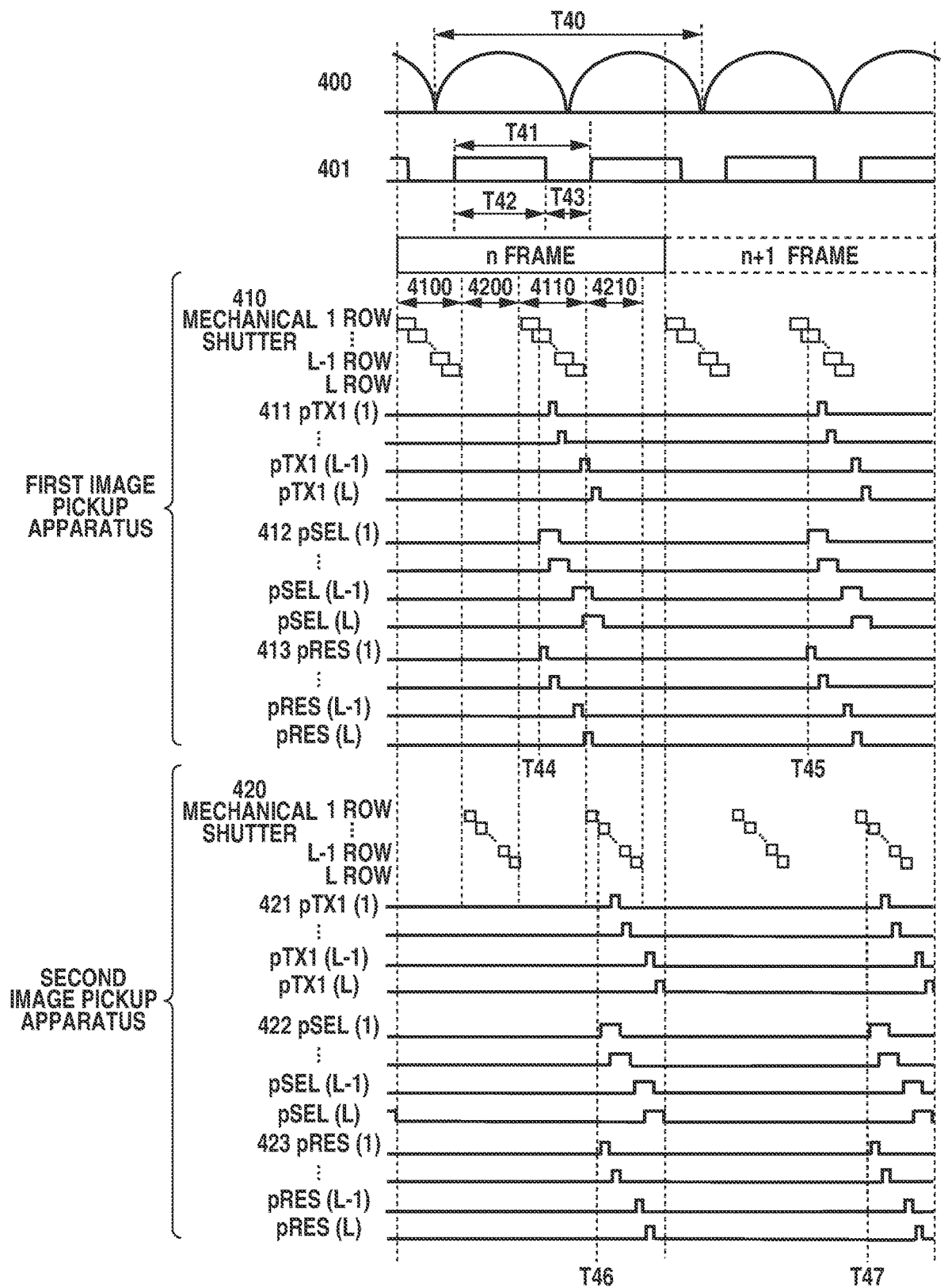
FIG. 4 is a timing chart of driving of the image pickup system according to at least the first exemplary embodiment.

FIG. 4 is a timing chart illustrating the operation of the image pickup system 100. A waveform 400 schematically illustrates a waveform of an AC power supply subjected to full-wave rectification. The AC power supply is a power supply having a frequency of, for example, 50 Hz or 60 Hz. A period T40 in FIG. 4 corresponds to a cycle of the AC power supply, and is, for example, 1/50 seconds or 1/60 seconds.

A waveform 401 indicates a blinking state of a light source using the power supply having the waveform 400. H level indicates a lighting-on state, and L level indicates a lighting-off state. Examples of the light source using the AC power supply includes an LED light source for a traffic signal. When the waveform 400 of the power supply subjected to the full-wave rectification has a value higher than a predetermined threshold, the waveform 401 becomes the H level and the light source is put into the lighting-on state. In contrast, when the waveform 400 has a value equal to or lower than the predetermined threshold, the waveform 401 becomes the L level and the light source is put into the lighting-off state.

A period T41 indicates a blinking cycle of the light source, and is ½ cycle of the period T40 that is the cycle of the AC power supply. In addition, a period T42 indicates a period during which the light source is turned on, and a period T43 indicates a period during which the light source is turned off.

Reference numerals 410 and 420 respectively indicate opening/closing states of the mechanical shutters 110 that are disposed on the light incident side of the first image pickup apparatus 101 and the second image pickup apparatus 102. A part with a rectangle indicates an opening state, and a part without a rectangle indicates a closing state. Opening periods of the mechanical shutters 110 substantially correspond to an exposure period of the first image pickup apparatus 101 and an exposure period of the second image pickup apparatus 102. Therefore, the reference numeral 410 and the reference numeral 4200 are also referred to as an exposure period 410 and an exposure period 4200, respectively.

Each of signal waveforms 411 and 421 indicates a waveform of a signal inputted to the control line pTX1 of the transfer switch 304. When the control line pTX1 of the transfer switch 304 is controlled from the L level to the H level, the transfer switch 304 is turned on, and the electric charges in the photoelectric conversion portion 301 are transferred to the input node 303 including the FD 302.

Subsequently, the control signal of the control line pTX1 is returned from the H level to the L level after the electric charges are transferred from the photoelectric conversion portion 301 to the FD 302.

Each of signal waveforms 412 and 422 indicates a waveform of a signal inputted to the control line pSEL of the selection transistor 307. When the control line pSEL of the selection transistor 307 is controlled from the L level to the H level, the selection transistor 307 is turned on, and outputs, to the vertical output line 308, a current that has been provided from the power supply 309 and has passed through the amplification portion 306.

Each of signal waveforms 413 and 423 indicates a waveform of a signal input to the control line pRES of the reset transistor 305. When the control line pRES of the reset transistor 305 is controlled from the L level to the H level, the reset transistor 305 is turned on, and the electric charges in the input node 303 including the FD 302 are discharged to the power supply 309.

As illustrated in FIG. 4, the mechanical shutter 110 of each of the first image pickup apparatus 101 and the second image pickup apparatus 102 is repeatedly opened and closed in one frame so as to sequentially expose each row.

The opening period of the mechanical shutter 110 substantially corresponds to the exposure period of each of the first and second image pickup apparatuses. In other words, the light entering the photoelectric conversion portions 301 on the corresponding pixel row of each of the first and second image pickup apparatuses is converted into electric charges during the period in which the mechanical shutter 110 is opened in each row. During the period in which the mechanical shutter 110 is closed, the photoelectric conversion portions 301 on the corresponding pixel row of each of the first and second image pickup apparatuses do not generate electric charges, and continuously retain the electric charges. The electric charges are accumulated in the photoelectric conversion portions 301 by repeating the opening and closing operation of the mechanical shutter 110 sequentially row by row, i.e., repeating exposure of the corresponding pixel row of each of the first and second image pickup apparatuses, in such a manner.

In an optional frame, the final opening/closing of the sequential row-by-row opening/closing operation of the mechanical shutter 110 corresponds to final exposure of the corresponding pixel row of each of the first and second image pickup apparatuses. For example, in a case of a first row of the first image pickup apparatus, the final opening/closing of the mechanical shutter 110 corresponds to timings T44 and T55 in FIG. 4. In a case of a first row of the second image pickup apparatus, the final opening/closing of the mechanical shutter 110 corresponds to timings T46 and T47 in FIG. 4.

After the exposure is completed up to the final row, the control signal input to each of the control lines pSEL 412 and pSEL 422 of the first and second image pickup apparatuses is changed from the L level to the H level sequentially row by row. Next, the control signal input to each of the control lines pRES 413 and pRES 423 is changed from the L level to the H level sequentially row by row while the control signal of each of the control lines pSEL 412 and pSEL 422 is maintained at the H level. The electric charges remaining in the input node 303 are discharged to the power supply 309 through the operation. Next, the control signal of each of the control lines pRES 413 and pRES 423 is returned from the H level to the L level sequentially row by row while the control signal of each of the control lines pSEL 412 and pSEL 422 is maintained at the H level, and the reset transistor 305 is changed from an on-state to an off-state. Next, the control signal input to each of the control lines pTX 412 and pTX 422 is changed from the L level to the H level sequentially row by row while the control signal of each of the control lines pSEL 412 and pSEL 422 is maintained at the H level, which transfers the electric charges accumulated in the photoelectric conversion portion 301 to the FD 302. The electric charges transferred to the FD 302 become the pixel signal amplified by the amplification portion 306. The amplified pixel signal is outputted from the selection transistor 307 to the vertical output line 308. After the electric charges are transferred from the photoelectric conversion portion 301 to the FD 302, the control signal input to each of the control signal lines pTX 412 and pTX 422 is returned from the H level to the L level sequentially row by row, and the transfer switch 304 is turned off. Finally, the control signal of each of the control lines pSEL 412 and pSEL 422 is returned from the H level to the L level, and the selection transistor 307 is changed from an on-state to an off-state.

In FIG. 4, a plurality of exposure periods of the first image pickup apparatus 101 in one frame are denoted by reference numerals 4100 and 4110. Likewise, a plurality of exposure periods of the second image pickup apparatus 102 in one frame are denoted by reference numerals 4200 and 4210. In other words, in the first and second image pickup apparatuses, the plurality of exposure periods are repeated in one frame, and the electric charges generated in the photoelectric conversion portion 301 in the exposure periods are added in the photoelectric conversion portion 301.

In addition, the exposure periods 4100 and 4110 of the first image pickup apparatus 101 are overlapped with non-exposure periods of the second image pickup apparatus 102, and non-exposure periods of the first image pickup apparatus 101 are overlapped with the exposure periods 4200 and 4210 of the second image pickup apparatus 102. Further, the exposure periods 4100 and 4110 of the first image pickup apparatus 101 and the exposure periods 4200 and 4210 of the second image pickup apparatus 102 have complementary relation. In other words, the exposure period of the first image pickup apparatus 101 corresponds to the non-exposure period of the second image pickup apparatus 102, and the non-exposure period of the first image pickup apparatus 101 corresponds to the exposure period of the second image pickup apparatus 102. Further, the exposure period of the first image pickup apparatus 101 is not overlapped with the exposure period of the second image pickup apparatus 102, and the non-exposure period of the first image pickup apparatus 101 is not overlapped with the non-exposure period of the second image pickup apparatus 102 as well.

Figure 5:
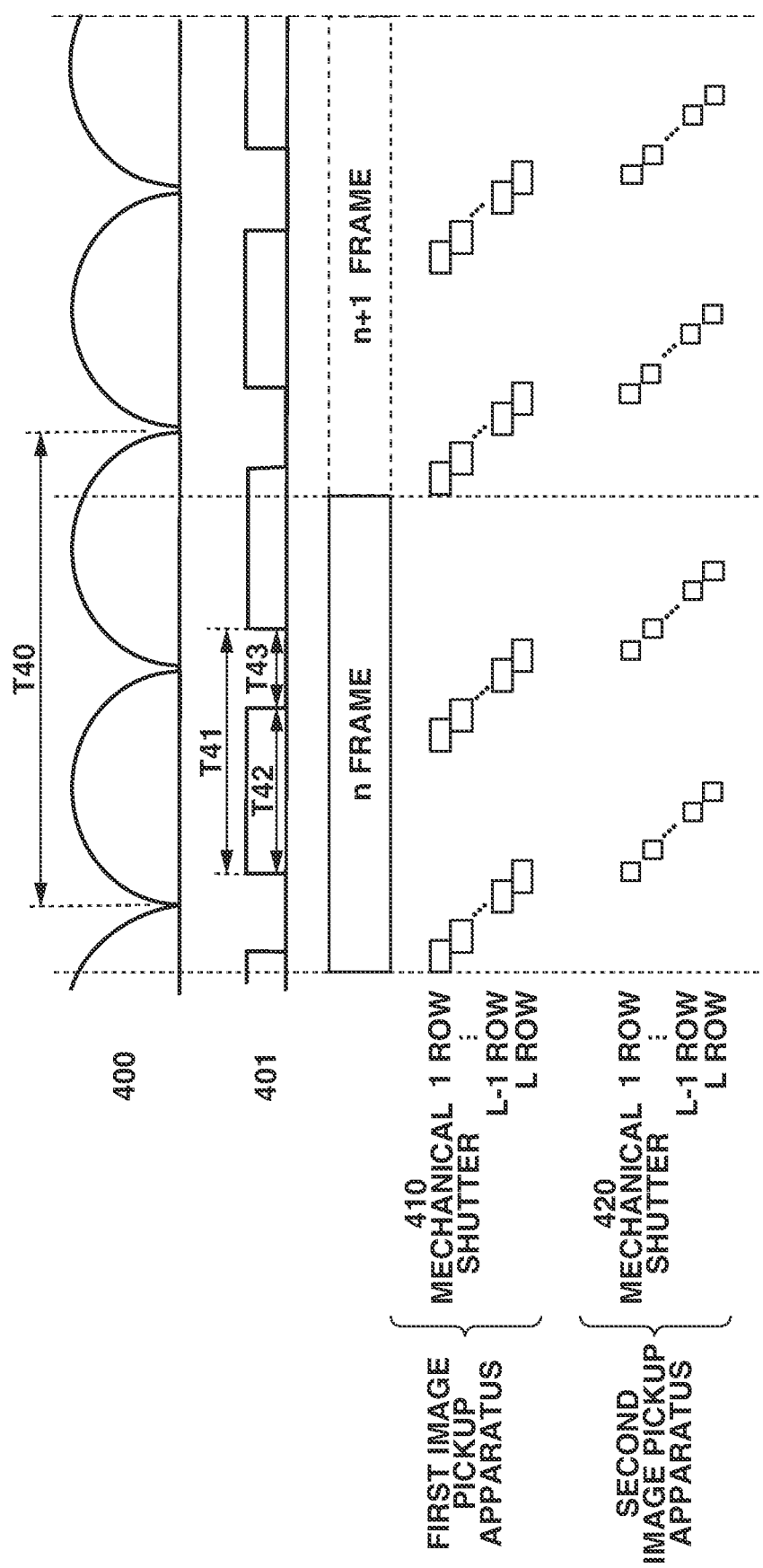
FIG. 5 is a timing chart of the driving of the image pickup system according to at least the first exemplary embodiment.

Note that, in FIG. 4, the exposure period of the first image pickup apparatus 101 is not overlapped with the exposure period of the second image pickup apparatus 102; however, the exposure period of the first image pickup apparatus 101 may be partially overlapped with the exposure period of the second image pickup apparatus 102 as illustrated in FIG. 5 described below. Even in the case of FIG. 5, as described above, the relation that the exposure period of the first image pickup apparatus 101 is overlapped with the non-exposure period of the second image pickup apparatus 102 and the non-exposure period of the first image pickup apparatus 101 is overlapped with the exposure period of the second image pickup apparatus 102, is satisfied. Moreover, two images acquired by the respective image pickup apparatuses become higher in synchronicity as the time in which the exposure period of the first image pickup apparatus 101 is overlapped with the exposure period of the second image pickup apparatus 102 is longer. Therefore, it is possible to acquire a distance to a photographic subject with higher accuracy. At this time, a period in which the exposure period of the first image pickup apparatus 101 is overlapped with the exposure period of the second image pickup apparatus 102 is referred to as a first period. A period in which the non-exposure period of the first image pickup apparatus 101 is overlapped with the exposure period of the second image pickup apparatus 102 is referred to as a second period. Further, a period in which the exposure period of the first image pickup apparatus 101 is overlapped with the non-exposure period of the second image pickup apparatus 102 is referred to as a third period. In this case, making the first period longer than the second period and the third period makes it possible to acquire images secured with higher synchronicity.

In addition, in FIG. 4, the respective lengths of the exposure periods 4100 and 4110 of the first image pickup apparatus 101 are made longer than the respective lengths of the exposure periods 4200 and 4210 of the second image pickup apparatus 102. The length of the exposure period of the first image pickup apparatus 101, however, may be equal to the length of the exposure period of the second image pickup apparatus 102, or the length of the exposure period of the second image pickup apparatus 102 may be longer than the length of the exposure period of the first image pickup apparatus 101. In a case where the length of the exposure period of the first image pickup apparatus 101 is different from the length of the exposure period of the second image pickup apparatus 102, it is possible to synthesize information acquired from the image pickup apparatuses to form an image with expanded dynamic range.

In the first exemplary embodiment, the exposure period of the first image pickup apparatus 101 and the exposure period of the second image pickup apparatus are repeated a plurality of times in one frame, which allows for countermeasures against flicker.

In addition, in the first exemplary embodiment, the exposure period of the second image pickup apparatus 102 is present even in the non-exposure period of the first image pickup apparatus 101, and the exposure period of the first image pickup apparatus 101 is present even in the non-exposure period of the second image pickup apparatus 102. Since the exposure period of the first image pickup apparatus 101 is present even in the non-exposure period of the second image pickup apparatus 102, it is possible to suppress missing of information, as compared with the technology discussed in Japanese Patent Application Laid-Open No. 2009-165081.

A second exemplary embodiment is described below. The second exemplary embodiment is different from the first exemplary embodiment in that the exposure period is controlled with use of an electronic shutter. In addition, in the second exemplary embodiment, a charge holding portion is provided between the photoelectric conversion portion and the FD. The description thereof is given with reference to FIG. 6, FIG. 7, FIG. 8, and the like.

(Block Diagram of Image Pickup System)

Figure 6:
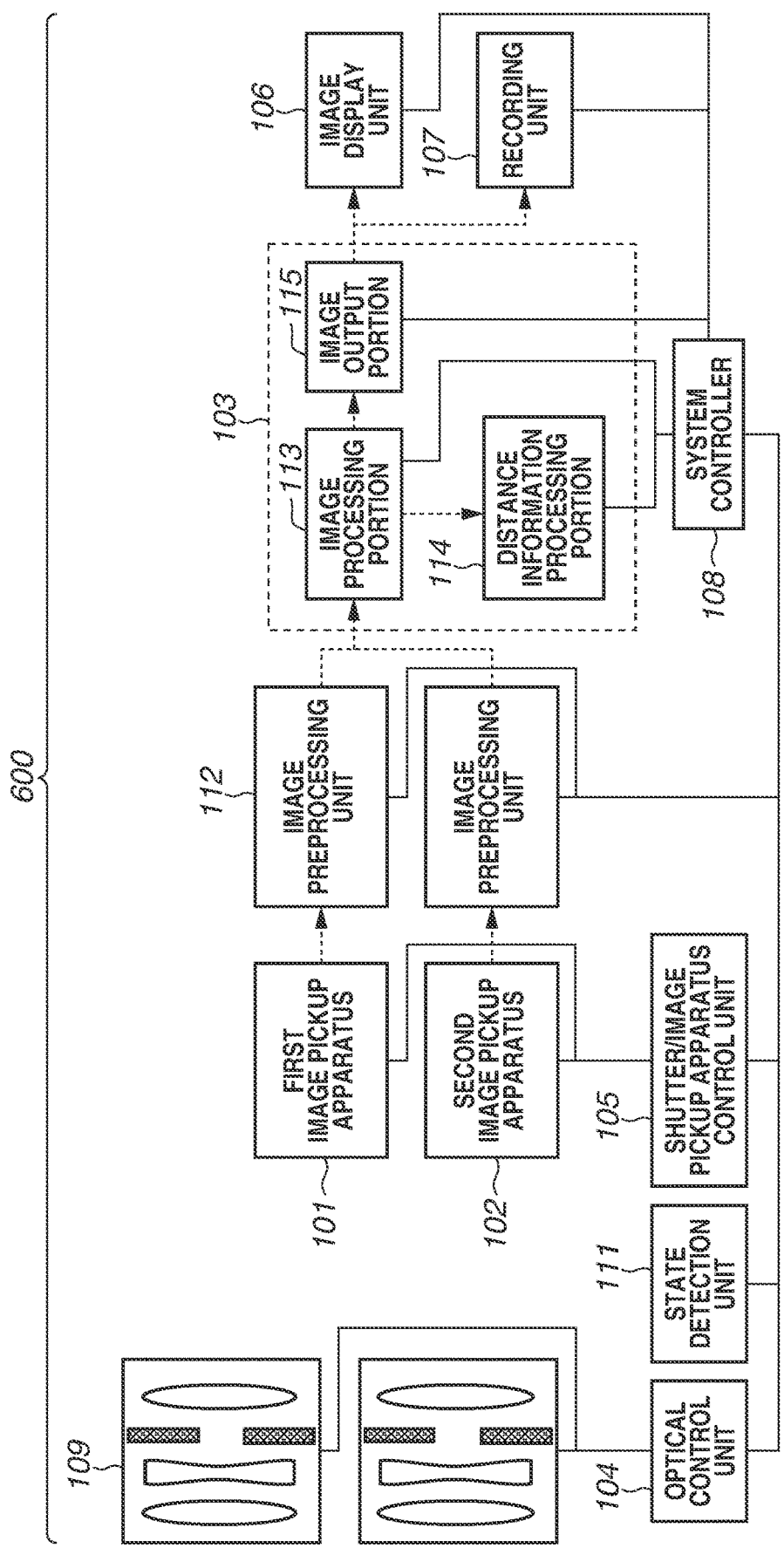
FIG. 6 is a block diagram of an image pickup system according to at least a second exemplary embodiment.

FIG. 6 is a block diagram of an image pickup system 600 according to the second exemplary embodiment. An image pickup system 600 includes two or more image pickup apparatuses 101 and 102, the signal processing unit 103, the optical control unit 104, the shutter/image pickup apparatus control unit 105, the image display unit 106, the recording unit 107, and the system controller 108.

In addition, the shutter/image pickup apparatus control unit 105 synchronizes operations of the two image pickup apparatuses 101 and 102. More specifically, the shutter/image pickup apparatus control unit 105 generates a periodic signal that synchronizes the two image pickup apparatuses 101 and 102, controls the respective exposure periods of the image pickup apparatuses 101 and 102, and generates a signal that controls a timing relating to generation and output of an image signal.

(Block Diagram of Image Pickup Apparatus)

The image pickup apparatus according to the present exemplary embodiment can have block arrangement similar to that in FIG. 2. A function of supplying, through the vertical scanning unit 13, a driving signal that causes shutter operation on a pixel row basis or on a plurality of pixel rows basis is added to the control unit 12.

(Equivalent Circuit Diagram of Pixel Portion)

Figure 7:
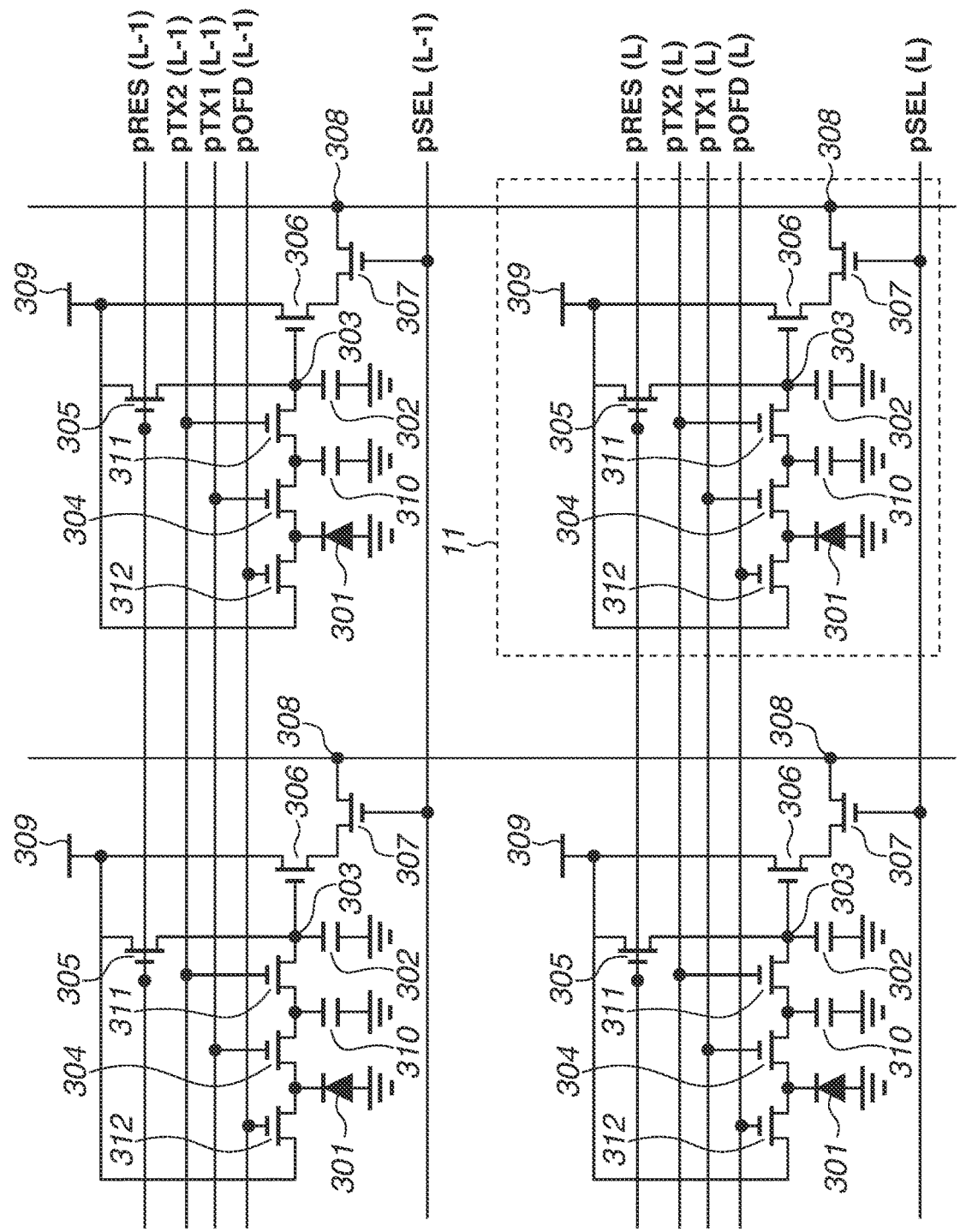
FIG. 7 is an equivalent circuit diagram of a pixel portion according to at least the second exemplary embodiment.

FIG. 7 illustrates a configuration of an equivalent circuit of the pixel 11. The pixel 11 includes, in addition to the configuration of FIG. 3, a charge holding portion 310, a first transfer switch 304 that transfers electric charges from the photoelectric conversion portion 301 to the charge holding portion 310, and a second transfer switch 311 that transfers electric charges from the charge holding portion 310 to the floating diffusion 302. The pixel 11 further includes an overflow drain transistor 312 that discharges electric charges from the photoelectric conversion portion 301 to the power supply 309.

A plurality of pixels arranged in the same row are connected to same control lines pTX1, pTX2, and pOFD that respectively operate the first transfer switches 304, the second transfer switches 311, and the overflow drain transistors 312 of the pixels concurrently in the same row.

(Timing Chart)

Figure 8:
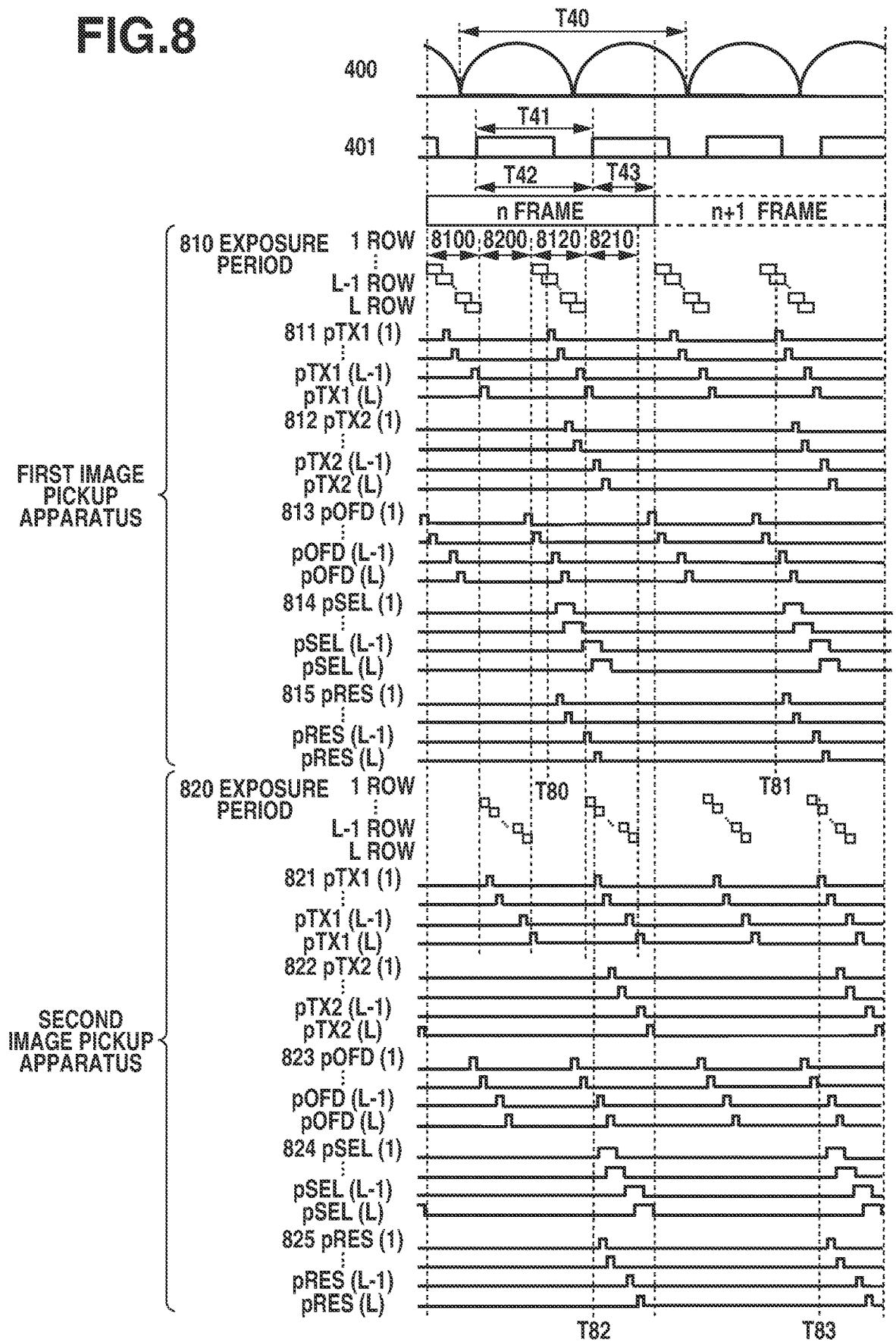
FIG. 8 is a timing chart of driving of the image pickup system according to at least the second exemplary embodiment.

FIG. 8 is a timing chart illustrating the operation of the image pickup system 600. Reference numerals 810 and 820 respectively indicate exposure periods of the first image pickup apparatus 101 and the second image pickup apparatus 102. In other words, a part with a rectangle indicates an exposure period, and a part without a rectangle indicates a non-exposure period.

Each of signal waveforms 811 and 821 indicates a waveform of a signal inputted to the control line pTX1 of the first transfer switch 304. When the control line pTX1 of the first transfer switch 304 is controlled from the L level to the H level, the transfer switch 304 operates and the electric charges in the photoelectric conversion portion 301 are transferred to the charge holding portion 310.

Each of signal waveforms 812 and 822 indicates a waveform of a signal input to the control line pTX2 of the second transfer switch 311. When the control line pTX2 of the second transfer switch 311 is controlled from the L level to the H level, the second transfer switch 311 operates, and the electric charges in the charge holding portion 310 are transferred to the FD 302. In other words, the electric chares are transferred to the input node 303 of the amplification portion 306.

Each of signal waveforms 813 and 823 indicates a waveform of a signal input to the control line pOFD of the overflow drain transistor 312. When the control line pOFD of the overflow drain transistor 312 is controlled from the L level to the H level, the overflow drain transistor 312 operates, and the electric charges in the photoelectric conversion portion 301 are discharged to the power supply 309.

Each of signal waveforms 814 and 824 indicates a waveform of a signal inputted to the control line pSEL of the selection transistor 307. When the control line pSEL of the selection transistor 307 is controlled from the L level to the H level, the selection transistor 307 operates, and outputs, to the vertical output line 308, a current that has been provided from the power supply 309 and has passed through the amplification portion 306.

Each of signal waveforms 815 and 825 indicates a waveform of a signal input to the control line pRES of the reset transistor 305. When the control line pRES of the reset transistor 305 is controlled from the L level to the H level, the reset transistor 305 operates, and the electric charges in the input node 303 between the FD 302 and the amplification portion 306 are discharged to the power supply 309.

The control signal input to each of the control signal lines pOFD 813 and pOFD 823 is changed from the L level to the H level prior to exposure periods 810 and 820. This causes the electric charges remaining in the photoelectric conversion portion 301 to be discharged to the power supply 309.

Next, when the control signal of each of the control lines pOFD 813 and pOFD 823 is returned from the H level to the L level sequentially row by row, the first and second image pickup apparatuses respectively start the exposure periods 810 and 820.

Next, when the control signal input to each of the control lines pTX1 811 and pTX1 821 is changed from the L level to the H level, the exposure periods 810 and 820 are terminated, and transfer of the electric charges from the photoelectric conversion portion 301 to the charge holding portion 310 is started.

Next, after the electric charges are transferred from the photoelectric conversion portion 301 to the charge holding portion 310, the control signal of each of the control lines pTX1 811 and pTX1 821 is returned from the H level to the L level.

Next, in the first and second image pickup apparatuses, second and subsequent exposure in an optional frame and transfer of the electric charges from the photoelectric conversion portion 301 to the charge holding portion 301 are performed with use of the above-described driving method.

As described above, the electric charges that are generated in the photoelectric conversion portion 301 in the exposure period through the exposure repeated in the optional frame are added in the charge holding portion 310.

In the optional frame, for example, final exposure of the first and second image pickup apparatuses in the sequential row-by-row exposure corresponds to timings T80 and T81 in FIG. 8 in the case of the first row of the first image pickup apparatus, and corresponds to timings T82 and T83 in FIG. 8 in the case of the first row of the second image pickup apparatus.

Next, the control signal input to each of the control signal lines pSEL 814 and pSEL 824 of the first and second image pickup apparatuses is changed from the L level to the H level sequentially row by row. Further, the control signal input to each of the control lines pRES 815 and pRES 825 is changed from the L level to the H level sequentially row by row while the control signal of each of the control lines pSEL 814 and pSEL 824 are maintained at the H level. The electric discharges remaining in the input node 303 of the amplification portion 306 are discharged to the power supply 309 through the operation.

Next, the control signal of each of the control lines pRES 815 and pRES 825 is returned from the H level to the L level sequentially row by row while the control signal of each of the control lines pSEL 814 and pSEL 824 is maintained at the H level.

Next, the control signal input to each of the control lines pTX2 812 and pTX2 822 of the first and second image pickup apparatuses is changed from the L level to the H level sequentially row by row while the control signal of each of the control lines pSEL 814 and pSEL 824 is maintained at the H level. As a result, the electric charges that are generated by the exposure of the photoelectric conversion portion 301 repeated in the optional frame are transferred from the charge holding portion 310 to the FD 302. The electric charges transferred to the FD 302 operate the amplification portion 306 through the input node 303, thereby becoming the amplified pixel signal.

Further, since the control signal input to each of the control lines pSEL 814 and pSEL 824 in the first and second image pickup apparatuses has been already changed to the H level, the amplified pixel signal is outputted from the selection transistor 307 to the vertical output line 308. After the electric charges are transferred from the charge holding portion 310 to the FD 302, the control signal of each of the control lines pTX2 812 and pTX 822 is returned from the H level to the L level sequentially row by row. Finally, the control signal of each of the control lines pSEL 814 and pSEL 824 is returned from the H level to the L level.

As illustrated in FIG. 8, in the first image pickup apparatus 101 and the second image pickup apparatus 102, exposure is performed sequentially row by row and is repeatedly performed in one frame. Further, exposure periods 8100 and 8120 of the first image pickup apparatus 101 and exposure periods 8200 and 8210 of the second image pickup apparatus 102 have complementary relation. Furthermore, the exposure periods 8100 and 8120 of the first image pickup apparatus 101 are overlapped with non-exposure periods of the second image pickup apparatus 102, and non-exposure periods of the first image pickup apparatus 101 are overlapped with the exposure periods 8200 and 8210 of the second image pickup apparatus 102.

Note that, in FIG. 8, the exposure period of the first image pickup apparatus 101 is not overlapped with the exposure period of the second image pickup apparatus 102; however, the exposure period of the first image pickup apparatus 101 may be partially overlapped with the exposure period of the second image pickup apparatus 102. Even in this case, the relation that the exposure period of the first image pickup apparatus 101 is overlapped with the non-exposure period of the second image pickup apparatus 102 and the non-exposure period of the first image pickup apparatus 101 is overlapped with the exposure period of the second image pickup apparatus 102, is satisfied.

In the second exemplary embodiment, the exposure period of the first image pickup apparatus 101 and the exposure period of the second image pickup apparatus 102 are repeated a plurality of times in one frame, which allows for countermeasures against flicker.

In addition, in the second exemplary embodiment, the exposure period of the second image pickup apparatus 102 is present even in the non-exposure period of the first image pickup apparatus 101, and the exposure period of the first image pickup apparatus 101 is present even in the non-exposure period of the second image pickup apparatus 102. Since the exposure period of the first image pickup apparatus 101 is present even in the non-exposure period of the second image pickup apparatus 102, it is possible to suppress missing of information, as compared with the technology disclosed in Japanese Patent Application Laid-Open No. 2009-165081.

A third exemplary embodiment is described below. The third exemplary embodiment relates to an image pickup system that employs a global electronic shutter method in which exposure periods of respective pixels disposed in each row are aligned. The image pickup apparatus 101 (102) illustrated in FIG. 2, the image pickup system 600 illustrated in FIG. 6, and the equivalent circuit diagram of the pixel portion illustrated in FIG. 7 are also applied to the third exemplary embodiment.

(Timing Chart)

Figure 9:
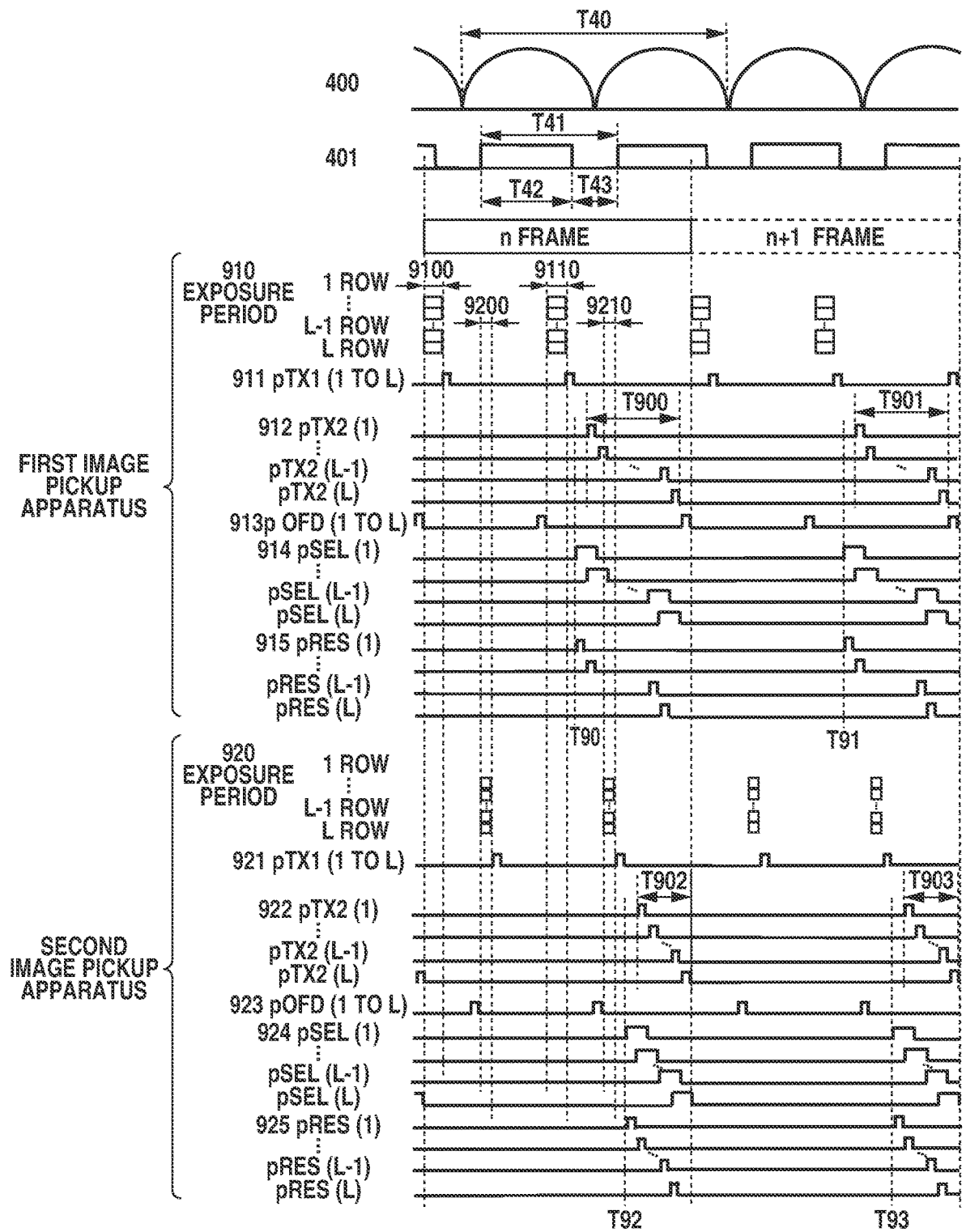
FIG. 9 is a timing chart of driving of an image pickup system according to at least a third exemplary embodiment.

FIG. 9 is a timing chart illustrating the operation of the image pickup system 600 in the present exemplary embodiment. Reference numerals 910 and 920 of rectangles respectively indicate exposure periods of the first image pickup apparatus 101 and the second image pickup apparatus 102 in the image pickup system 600. In other words, a part with a rectangle indicates an exposure period, and a part without a rectangle indicates a non-exposure period.

Each of signal waveforms 911 and 921 indicates a waveform of a signal inputted to the control line pTX1 of the first transfer switch 304. Each of signal waveforms 912 and 922 indicates a waveform of a signal inputted to the control line pTX2 of the second transfer switch 311. Each of signal waveforms 913 and 923 indicates a waveform of a signal inputted to the control line pOFD of the overflow drain transistor 312. Each of signal waveforms 914 and 924 indicates a waveform of a signal inputted to the control line pSEL of the selection transistor 307. Each of signal waveforms 915 and 925 indicates a waveform of a signal inputted to the control line pRES of the reset transistor 305.

In FIG. 9, the exposure period is started and ended on the pixels in all rows concurrently, and exposure is repeatedly performed a plurality of times in one frame.

Prior to exposure periods 910 and 920 for all rows, the control signal input to each of the control lines pOFD 913 and pOFD 923 is changed from the L level to the H level concurrently in all rows. This causes the electric charges remaining in the photoelectric conversion portion 301 in each pixel are discharged to the power supply 309.

Next, when the control signal of each of the control lines pOFD 913 and pOFD 923 is returned from the H level to the L level concurrently in all pixels, the first and second image pickup apparatuses respectively start the exposure periods 910 and 920 concurrently for all pixels.

Next, when the control signal input to each of the control lines pTX1 911 and pTX1 921 is changed from the L level to the H level concurrently in all rows, the exposure periods 910 and 920 are terminated concurrently in all pixels, and the electric charges are transferred from the photoelectric conversion portion 301 to the charge holding portion 310 concurrently in all pixels.

Next, after the electric charges are transferred from the photoelectric conversion portion 301 to the charge holding portion 310 in all pixels, the control signal of each of the control lines pTX1 911 and pTX1 921 in all rows is concurrently returned from the H level to the L level.

Next, in the first and second image pickup apparatuses, second and subsequent exposure in the optional frame and transfer of the electric charges from the photoelectric conversion portion 301 to the charge holding portion 310 are performed with use of the above-described driving method.

As described above, the electric charges that are generated in the photoelectric conversion portion 301 in the exposure period through the exposure repeated in the optional frame are added in the charge holding portion 310.

In the optional frame, for example, final concurrent exposure for all pixels in the first and second image pickup apparatuses corresponds to timings T90 and T91 in FIG. 9 in the case of the first image pickup apparatus, and corresponds to timings T92 and T93 in FIG. 9 in the case of the second image pickup apparatus.

After the final concurrent exposure for all pixels, the control signal input to each of the control lines pSEL 914 and pSEL 924 is changed from the L level to the H level sequentially row by row. Next, the control signal input to each of the control lines pRES 915 and pRES 925 is changed from the L level to the H level sequentially row by row while the control signal of each of the control lines pSEL 914 and pSEL 924 is maintained at the H level. The electric charges remaining in the FD 302 and the input node 303 are discharged to the power supply 309 through the operation. Next, the control signal of each of the control lines pRES 915 and pRES 925 is returned from the H level to the L level sequentially row by row while the control signal of each of the control lines pSEL 914 and pSEL 924 is maintained at the H level.

Subsequently, the control signal input to each of the control lines pTX2 912 and pTX2 922 is changed from the L level to the H level sequentially row by row while the control signal of each of the control lines pSEL 914 and pSEL 924 is maintained at the H level. As a result, the electric charges that are generated by the exposure of the photoelectric conversion portion 301 repeated in the optional frame are transferred from the first charge holding portion 310 to the FD 302 sequentially row by row. The electric charges transferred to the charge holding portion 310 operate the amplification portion 306 through the input node 303, thereby becoming the amplified pixel signal.

The amplified pixel signal is outputted from the selection transistor 307 to the vertical output line 308 in periods T900 and T902 in the case of the exposure of n frame, or in periods T901 and T903 in the case of exposure of n+1 frame. After the electric charges are transferred from the charge holding portion 310 to the FD 302 sequentially row by row, the control signal of each of the control lines pTX2 912 and pTX2 922 in all rows is returned from the H level to the L level sequentially row by row.

Finally, the control signal of each of the control lines pSEL 914 and pSEL 924 is returned from the H level to the L level sequentially row by row.

As illustrated in FIG. 9, in the first image pickup apparatus 101 and the second image pickup apparatus 102, the exposure is concurrently performed on all rows, and the exposure is repeatedly performed in one frame. In addition, exposure periods 9100 and 9110 of the first image pickup apparatus 101 are overlapped with non-exposure periods of the second image pickup apparatus 102, and non-exposure periods of the first image pickup apparatus 101 are overlapped with exposure periods 9200 and 9210 of the second image pickup apparatus 102.

In the third exemplary embodiment, since start and end of the exposure periods are determined concurrently for all rows, it is possible to pick up images secured with temporal synchronicity, and to pick up images while suppressing image distortion that easily occurs when an image of an object moving at high speed is picked up.

In addition, in the third exemplary embodiment, the exposure period of the first image pickup apparatus 101 and the exposure period of the second image pickup apparatus are repeated a plurality of times in one frame, which allows for countermeasures against flicker.

Further, in the third exemplary embodiment, the exposure period of the second image pickup apparatus 102 is present even during the non-exposure period of the first image pickup apparatus 101, and the exposure period of the first image pickup apparatus 101 is present even during the non-exposure period of the second image pickup apparatus 102. Since the exposure period of the first image pickup apparatus 101 is present even in the non-exposure period of the second image pickup apparatus 102, it is possible to suppress missing of information, as compared with the technology disclosed in Japanese Patent Application Laid-Open No. 2009-165081.

Figure 10A:
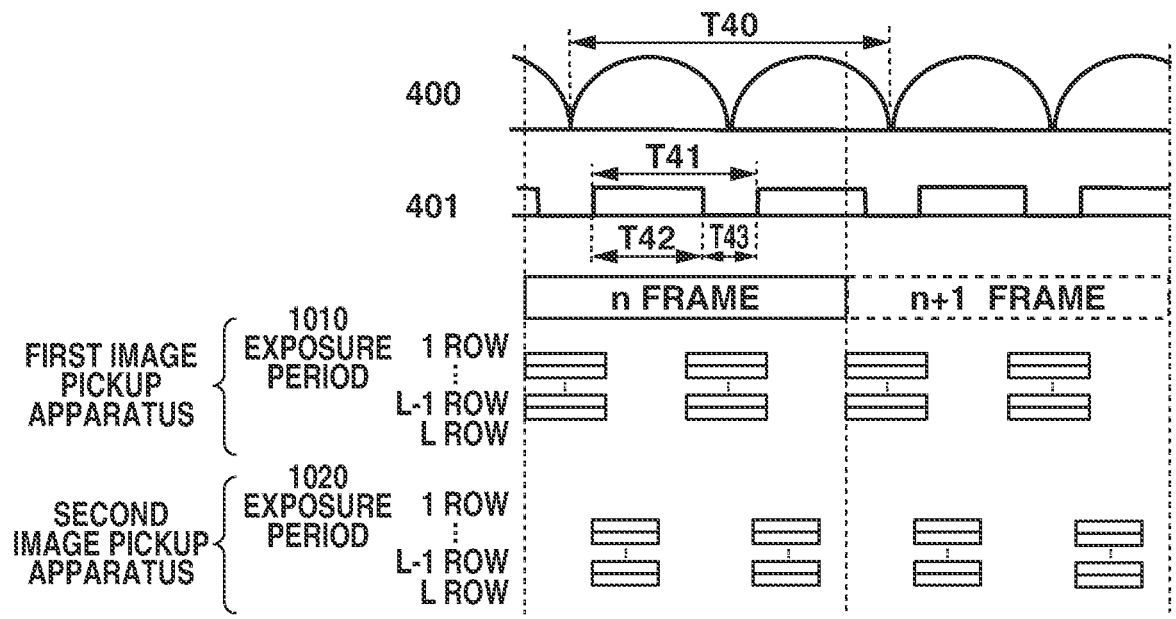
FIGS. 10A and 10B are timing charts of the driving of the image pickup system according to at least the third exemplary embodiment.

Note that, in FIG. 9, the exposure period of the first image pickup apparatus 101 is not overlapped with the exposure period of the second image pickup apparatus 102. As illustrated in FIG. 10A, however, an exposure period 1010 of the first image pickup apparatus 101 may be partially overlapped with an exposure period 1020 of the second image pickup apparatus 102. Even in this case, the relation that the exposure period of the first image pickup apparatus 101 is overlapped with the non-exposure period of the second image pickup apparatus 102 and the non-exposure period of the first image pickup apparatus 101 is overlapped with the exposure period of the second image pickup apparatus 102, is satisfied.

Figure 10B:
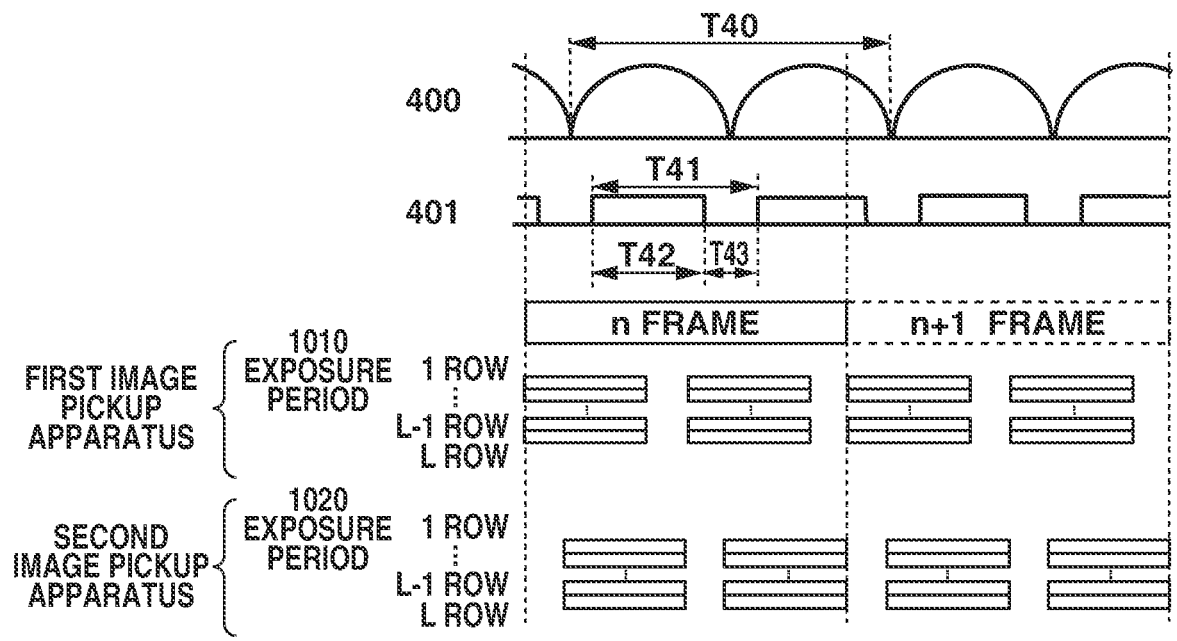

In addition, as illustrated in FIG. 10B, the entire non-exposure period of the first image pickup apparatus 101 may be overlapped with the exposure period 1020 of the second image pickup apparatus 102, and the entire non-exposure period of the second image pickup apparatus 102 may be overlapped with the exposure period 1010 of the first image pickup apparatus 101. With this configuration, the non-exposure period does not exist in the entire system, which allows for further suppression of missing of information.

Note that, in the third exemplary embodiment, the first image pickup apparatus 101 and the second image pickup apparatus 102 are both operated by driving of the global electronic shutter; however, one of the image pickup apparatuses may be operated by the driving of the global electronic shutter, and the other may be operated by driving of a rolling shutter.

A fourth exemplary embodiment is described below. The fourth exemplary embodiment relates to an image pickup system employing the global electronic shutter method. The fourth exemplary embodiment is different from the third exemplary embodiment in that two charge accumulation portions are provided for one pixel. The image pickup apparatus 101 (102) illustrated in FIG. 2 and the image pickup system 600 illustrated in FIG. 6 are also applied to the fourth exemplary embodiment.

(Equivalent Circuit Diagram of Pixel Portion)

Figure 11:
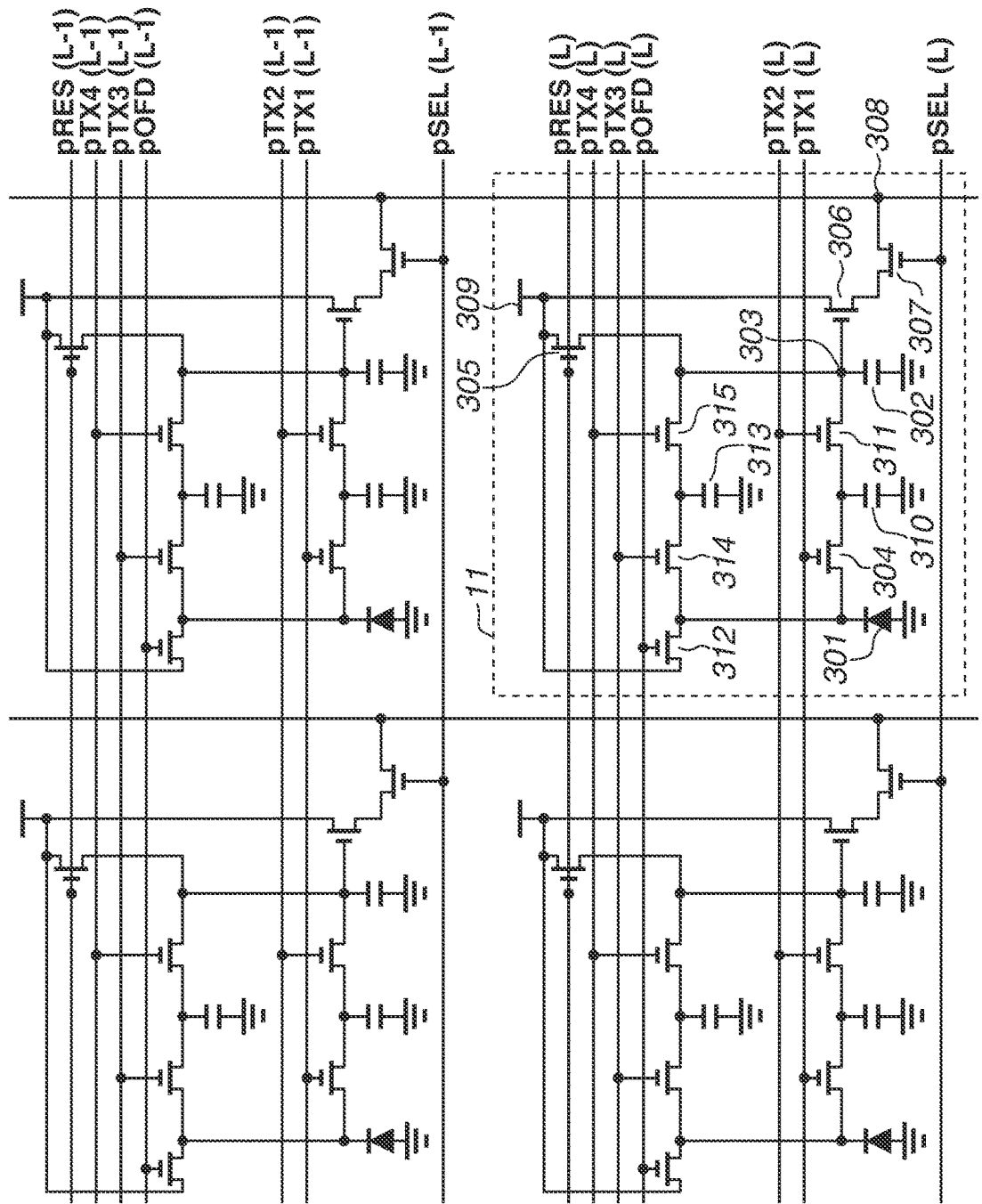
FIG. 11 is an equivalent circuit diagram of a pixel portion according to at least a fourth exemplary embodiment.

FIG. 11 illustrates a configuration of an equivalent circuit of the pixel 11 in the image pickup apparatus 101 or 102.

The pixel 11 includes, in addition to the configuration described in FIG. 7, a second charge holding portion 313, a third transfer switch 314, and a fourth transfer switch 315. A plurality of pixels arranged in the same row are connected to same control lines pTX3 and pTX4 that respectively operate and stop the third transfer switches 314 and the fourth transfer switches 315 of the pixels concurrently in the same row.

The electric charges generated in the photoelectric conversion portion 301 is transferred from the photoelectric conversion portion 301 to the second charge holding portion 313 through the operation of the third transfer switch 314, and the second charge holding portion 313 holds the transferred electric charges.

The transfer and stop of the electric charges of the third transfer switch 314 are controlled by a signal that is supplied through the control line pTX3. More specifically, the third transfer switch 314 transfers the electric charges when the signal of the control line pTX3 is changed from the L level to the H level, and the third transfer switch 314 stops the transfer of the electric charges when the signal of the control line pTX3 is changed from the H level to the L level.

The fourth transfer switch 315 transfers, to the charge holding portion 310, the electric charges generated in the second charge holding portion 313. The transfer and stop of the electric charges of the fourth transfer switch 315 are controlled by a signal that is supplied through the control line pTX4. More specifically, the fourth transfer switch 315 transfers the electric charges when the signal of the control line pTX4 is changed from the L level to the H level, and the fourth transfer switch 315 stops the transfer of the electric charges when the signal of the control line pTX4 is changed from the H level to the L level.

(Timing Chart)

Figure 12:
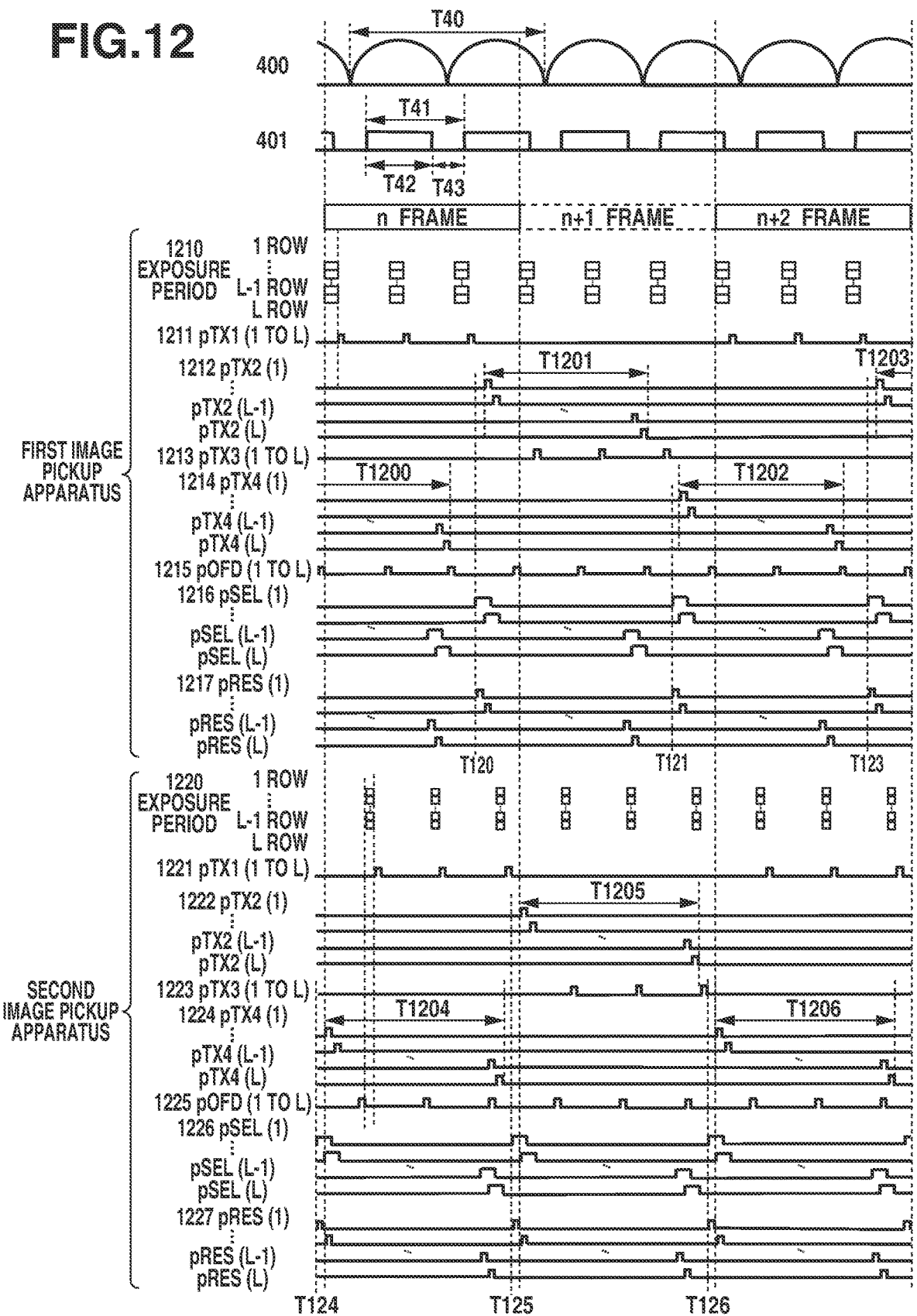
FIG. 12 is a timing chart of driving of an image pickup system according to at least the fourth exemplary embodiment.

FIG. 12 is a timing chart illustrating the operation of the image pickup system 600 according to the fourth exemplary embodiment. Reference numerals 1210 and 1220 indicate respective exposure periods of the first and second image pickup apparatuses in the image pickup system 600. In other words, a rectangular part with a rectangle indicates an exposure period, and a part without a rectangle indicates a non-exposure period.

Each of signal waveforms 1211 and 1221 indicates a waveform of a signal inputted to the control line pTX1 of the first transfer switch 304. Each of signal waveforms 1212 and 1222 indicates a waveform of a signal inputted to the control line pTX2 of the second transfer switch 311. Each of signal waveforms 1213 and 1223 indicates a waveform of a signal inputted to the control line pTX3 of the third transfer switch 314. Each of signal waveforms 1214 and 1224 indicates a waveform of a signal inputted to the control line pTX4 of the fourth transfer switch 315. Each of signal waveforms 1215 and 1225 indicates a waveform of a signal inputted to the control line pOFD of the overflow drain transistor 312. Each of signal waveforms 1216 and 1226 indicates a waveform of a signal inputted to the control line pSEL of the selection transistor 307. Each of signal waveforms 1217 and 1227 indicates a waveform of a signal inputted to the control line pRES of the reset transistor 305.

In the fourth exemplary embodiment, the pixel 11 of the image pickup apparatus 101 or 102 includes a first charge holding portion 310 and a second charge holding portion 313 that are connected in parallel to the photoelectric conversion portion 301. The first charge holding portion 310 and the second charge holding portion 313 function differently, for example, for each frame. For example, in n frame in FIG. 12, the electric charges are transferred from the photoelectric conversion portion 301 to the first charge holding portion 310 a plurality of times while the second charge holding portion transfers the holding electric charges to the FD 302 sequentially row by row. In contrast, in n+1 frame in FIG. 12, the electric charges are transferred from the photoelectric conversion portion 301 to the second charge holding portion 313 a plurality of times while the first charge holding portion 310 transfers the holding electric charges to the FD 302 sequentially row by row. As described above, the function of the first change holding portion 310 and the function of the second charge holding portion 313 are alternately changed for each frame.

Prior to first concurrent-exposure periods 1210 and 1220 for all rows in the n frame, the control signal input to each of the control lines pOFD 1215 and pOFD 1225 is changed from the L level to the H level concurrently in all rows. This causes the electric charges remaining in the photoelectric conversion portion 301 in each pixel are discharged to the power supply 309.

When the control signal of each of the control lines pOFD 1215 and pOFD 1225 is returned from the H level to the L level concurrently in all pixels, the first and second image pickup apparatuses respectively start the exposure periods 1210 and 1220 concurrently for all pixels.

Next, when the control signal of each of the control lines pTX1 1211 and pTX1 1221 is changed from the L level to the H level concurrently in all rows, the exposure periods 1210 and 1220 are terminated concurrently in all pixels, and the electric charges are transferred from the photoelectric conversion portion 301 to the first FD 302 concurrently in all pixels.

Next, after the electric charges are transferred from the photoelectric conversion portion 301 to the first charge holding portion 310 concurrently in all pixels, the control signal of each of the control lines pTX1 1211 and pTX1 1221 in all rows is concurrently returned from the H level to the L level. The exposure period for the photoelectric conversion portion 301 occurs in the same period over all pixels, and the electric charges generated in the period are transferred to the first charge holding portion 310.

Next, when second and subsequent exposure is performed in the n frame, the control signal of each of the control lines pOFD 1215 and pOFD 1225 is changed from the L level to the H level concurrently in all rows immediately before the exposure start, and the electric charges accumulated in the photoelectric conversion portion 301 are discharged to the power supply 309 in the non-exposure period.

Next, when the control signal of each of the control lines pOFD 1215 and pOFD 1225 is returned from the H level to the L level concurrently in all rows, the first and second image pickup apparatuses start the exposure concurrently for all pixels.

The procedures from the exposure end of the photoelectric conversion portion 301 to the transfer of the electric charges from the photoelectric conversion portion 301 to the first charge holding portion 310 are driven similarly to the first exposure in the n frame.

The electric charges generated in the exposure period of the photoelectric conversion portion 301 repeated in the n frame are added in the first charge holding portion 310. In the n frame, the final concurrent exposure for all pixels in the first and second image pickup apparatuses corresponds to a timing T120 in FIG. 12 in the case of the first image pickup apparatus and corresponds to a timing T125 in FIG. 12 in the case of the second image pickup apparatus.

After the final concurrent exposure for all pixels, the control signal input to each of the control lines pSEL 1216 and pSEL 1226 is changed from the L level to the H level sequentially row by row. Next, the control signal input to each of the control lines pRES 1215 and pRES 1225 is changed from the L level to the H level sequentially row by row while the control signal of each of the control lines pSEL 1216 and pSEL 1226 is maintained at the H level. The electric charges remaining in the input node 303 are discharged to the power supply 309 through the operation. Next, the control signal of each of the control lines pRES 1215 and pRES 1225 is returned from the H level to the L level sequentially row by row while the control signal of each of the control lines pSEL 1216 and pSEL 1226 is maintained at the H level.

Subsequently, the control signal input to each of the control lines pTX2 1212 and pTX2 1222 is changed from the L level to the H level sequentially row by row while the control signal of each of the control lines pSEL 1216 and pSEL 1226 is maintained at the H level. As a result, the electric charges that are generated in the exposure of the photoelectric conversion portion 301 repeated in the optional frame are transferred from the first charge holding portion 310 to the FD 302 sequentially row by row. The electric charges transferred to the charge holding portion 310 operate the amplification portion 306 through the input node 303, thereby becoming the amplified pixel signal.

The amplified pixel signal is outputted from the selection transistor 307 to the vertical output line 308 in periods T1201 and T1205 in the case of the exposure of the n frame. After the electric charges are transferred from the first FD 302 to the charge holding portion 310 sequentially row by row, the control signal of each of the control lines pTX2 1212 and pTX2 1222 in all rows is returned from the H level to the L level sequentially row by row.

Finally, the control signal of each of the control lines pSEL 1214 and pSEL 1224 is returned from the H level to the L level sequentially row by row.

On the other hand, a driving procedure of the path through which the electric charges are transferred from the photoelectric conversion portion 301 to the second charge holding portion 313 is as follows.

The second charge holding portion 313 in each pixel has already added and accumulated the electric charges that are generated in the exposure of the photoelectric conversion portion 301 in n−1 frame at the start of the n frame. For example, in the n−1 frame, the final concurrent exposure of all pixels in the second image pickup apparatus corresponds to a timing T124 in FIG. 12 in the case of the second image pickup apparatus. After the final concurrent exposure of all pixels, the control signal of each of the control lines pSEL 1214 and pSEL 1224 is changed from the L level to the H level sequentially row by row.

First, the control signal of each of the control lines pRES 1215 and pRES 1225 is changed from the L level to the H level sequentially row by row while the control signal of each of the control lines pSEL 1214 and pSEL 1224 is maintained at the H level. The electric charges remaining in the input node 303 are discharged to the power supply 309 through the operation. After the electric charges remaining in the input node 303 are discharged, the control signal of each of the control lines pRES 1215 and pRES 1225 is returned from the L level to the H level sequentially row by row while the control signal of each of the control lines pSEL 1214 and pSEL 1224 is maintained at the H level.

Subsequently, the control signal of each of the control lines pTX4 1214 and pTX4 1224 is changed from the L level to the H level sequentially row by row while the control signal of each of the control lines pSEL 1216 and pSEL 1226 is maintained at the H level. As a result, the electric charges that are generated in the exposure of the photoelectric conversion portion 301 repeated in the optional frame are transferred from the second charge holding portion 313 to the charge holding portion 310 sequentially row by row. The electric charges transferred to the charge holding portion 310 operate the amplification portion 306 through the input node 303, thereby becoming the amplified pixel signal.

The amplified pixel signal is outputted from the selection transistor 307 to the vertical output line 308 in periods T1200 and T1204 in the case of the exposure of the n−1 frame. After the electric charges are transferred from the second charge holding portion 313 to the charge holding portion 310 sequentially row by row, the control signal of each of the control lines pTX4 1214 and pTX4 1224 in all rows is returned from the H level to the L level sequentially row by row.

Next, the control signal of each of the control lines pSEL 1216 and pSEL 1226 is returned from the H level to the L level sequentially row by row. As described above, the electric charges that have been generated by the exposure of the photoelectric conversion portion 301 in the n−1 frame and accumulated in the second charge holding portion are outputted to the vertical output line 308 in the period of the n frame.

Likewise, in the n+1 frame, the control signal of the control line pTX3 is changed from the L level to the H level concurrently in all pixels to establish an ON state a plurality of times, and the electric charges are transferred from the photoelectric conversion portion 301 to the second charge holding portion 313 a plurality of times. The second charge holding portion 313 holds the electric charges that have been transferred the plurality of times. On the other hand, the first charge holding portion 310 changes the control signal of the control line pTX2 from the L level to the H level sequentially row by row, thereby transferring the electric charges from the first charge holding portion 310 to the FD 302. Moreover, in the same manner as the above-described driving, the pixel signal is outputted to the vertical output line 308 in the periods T1201 and T1205.

As described above, in the fourth exemplary embodiment, in the n frame (the first frame), the first transfer switch 304 is turned on a plurality of times to accumulate the electric charges in the first charge holding portion 310. In addition, in the n+1 frame (the second frame), the third transfer switch 314 is turned on a plurality of times to accumulate the electric charges in the second charge holding portion 313. Further, the third transfer switch 314 is maintained to be off in the n frame, and the first transfer switch 304 is maintained to be off in the n+1 frame.

In the fourth exemplary embodiment, since the start and the end of the exposure period are determined collectively for all rows, it is possible to pick up images secured with temporal synchronicity, and to pick up images while suppressing image distortion that easily occurs when an image of an object moving at high speed is picked up.

In addition, in the fourth exemplary embodiment, the exposure period of the first image pickup apparatus 101 and the exposure period of the second image pickup apparatus are repeated a plurality of times in one frame, which allows for countermeasures against flicker.

Further, in the fourth exemplary embodiment, the exposure period of the second image pickup apparatus 102 is present even in the non-exposure period of the first image pickup apparatus 101, and the exposure period of the first image pickup apparatus 101 is present even in the non-exposure period of the second image pickup apparatus 102. Since the exposure period of the first image pickup apparatus 101 is present even in the non-exposure period of the second image pickup apparatus 102, it is possible to suppress missing of information, as compared with the technology disclosed in Japanese Unexamined Patent Application Publication No. 2009-165081.

In addition, in the fourth exemplary embodiment, the two charge holding portions each repeatedly accumulating the electric charges provided from the photoelectric conversion portion 301, are provided. Therefore, in the optional frame, one of the charge holding portions plays a role of repeatedly accumulating the electric charged provided from the photoelectric conversion portion 301, and the other charge holding portion plays a role of transferring the electric charges to the following stage. Moreover, the role of repeatedly accumulating the electric charges and the role of transferring the electric charges to the following stage are alternately assigned to the first charge holding portion and the second charge holding portion. This makes it possible to perform driving while securing flexibility of the exposure period and the transfer period of the electric charges.

Note that, in FIG. 12, the exposure period of the first image pickup apparatus 101 is not overlapped with the exposure period of the second image pickup apparatus 102. The exposure period of the first image pickup apparatus 101, however, may be partially overlapped with the exposure period of the second image pickup apparatus 102.

Figure 13:
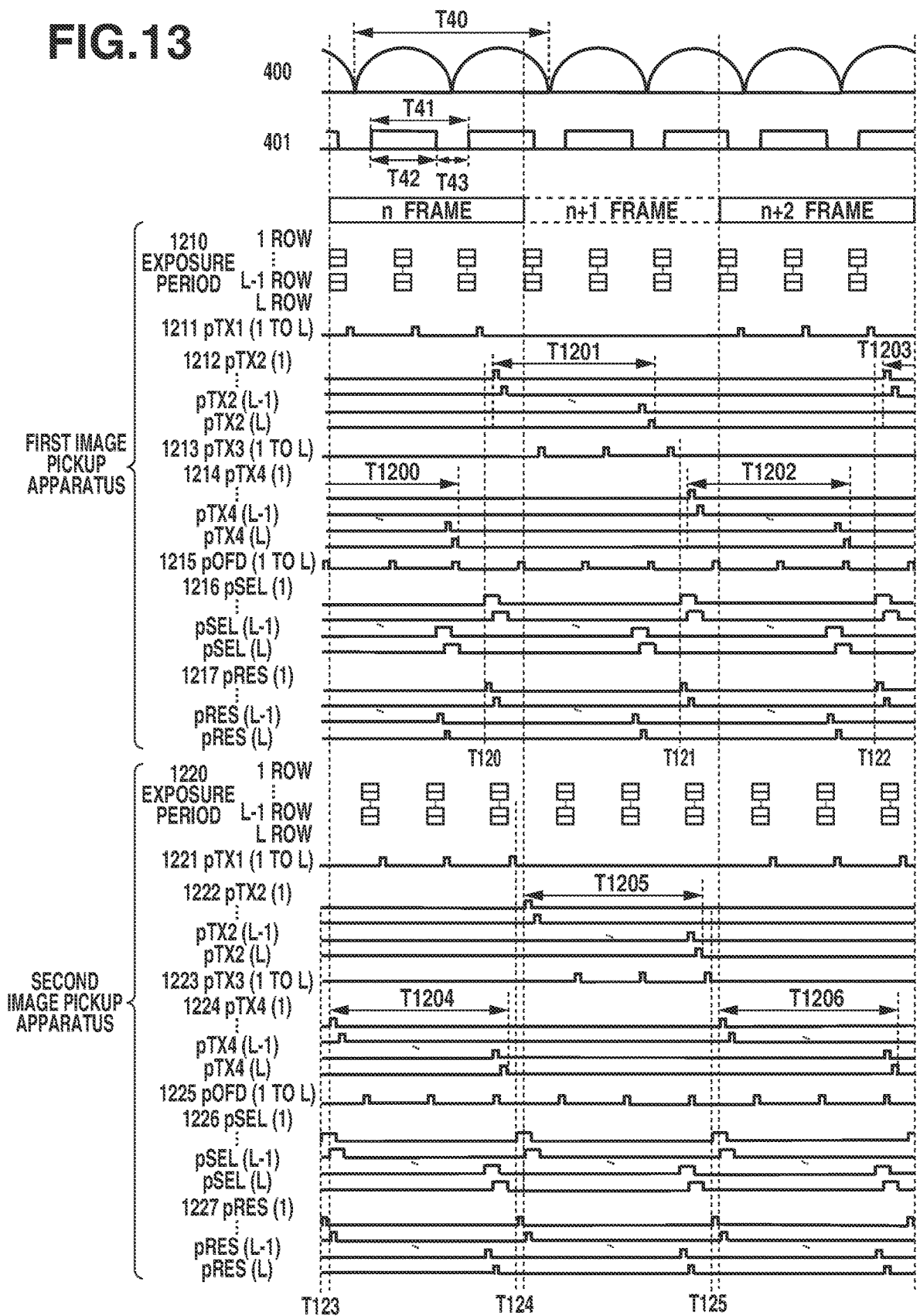
FIG. 13 is a timing chart of the driving of the image pickup system according to at least the fourth exemplary embodiment.

In FIG. 12, the length of each of the exposure periods of the first image pickup apparatus 101 is shorter than the length of each of the exposure periods of the second image pickup apparatus 102. As illustrated in FIG. 13, however, the length of each of the exposure periods of the first image pickup apparatus 101 may be made equal to the length of each of the exposure periods of the second image pickup apparatus 102.

Further, also in the fourth exemplary embodiment, the entire non-exposure period of the first image pickup apparatus 101 may be overlapped with the exposure period of the second image pickup apparatus 102, and the entire non-exposure period of the second image pickup apparatus 102 may be overlapped with the exposure period of the first image pickup apparatus 101. This configuration eliminates the non-exposure period in the entire system, which allows for further suppression of missing of information.

Note that, in the fourth exemplary embodiment, the pixel signal in the n frame of the first image pickup apparatus is outputted to the vertical output line 308 in the n frame and the n+1 frame (the period T1201). In addition, the pixel signal in the n frame of the second image pickup apparatus is outputted to the vertical output line 308 in the n+1 frame (the period T1205). In the first image pickup apparatus, however, the output to the vertical output line 308 may be performed only in the n+1 frame by delaying the start of the period T1201. In this case, it is possible to set the pixel signal transmitting period of each of the image pickup apparatuses within only the n+1 frame.

Further, according to the embodiment illustrated in FIG. 13, the exposure period in the optional frame of one of the image pickup apparatuses is equivalent to the exposure period in the optional frame of the other image pickup apparatus, and the phases of the exposure periods are inverted from each other. Such a configuration is achievable when the shutter/image pickup apparatus control unit 105 uses signals outputted from a signal generator and a frequency divider, as the shutter control signals of the respective image pickup apparatuses. The signal generator generates start timing and end timing of the exposure, and the frequency divider generates a delay signal having an inverted phase with respect to the timing. Therefore, it is possible to achieve an effect of enhancing sampling frequency with simple circuit configuration.

Figure 14A:
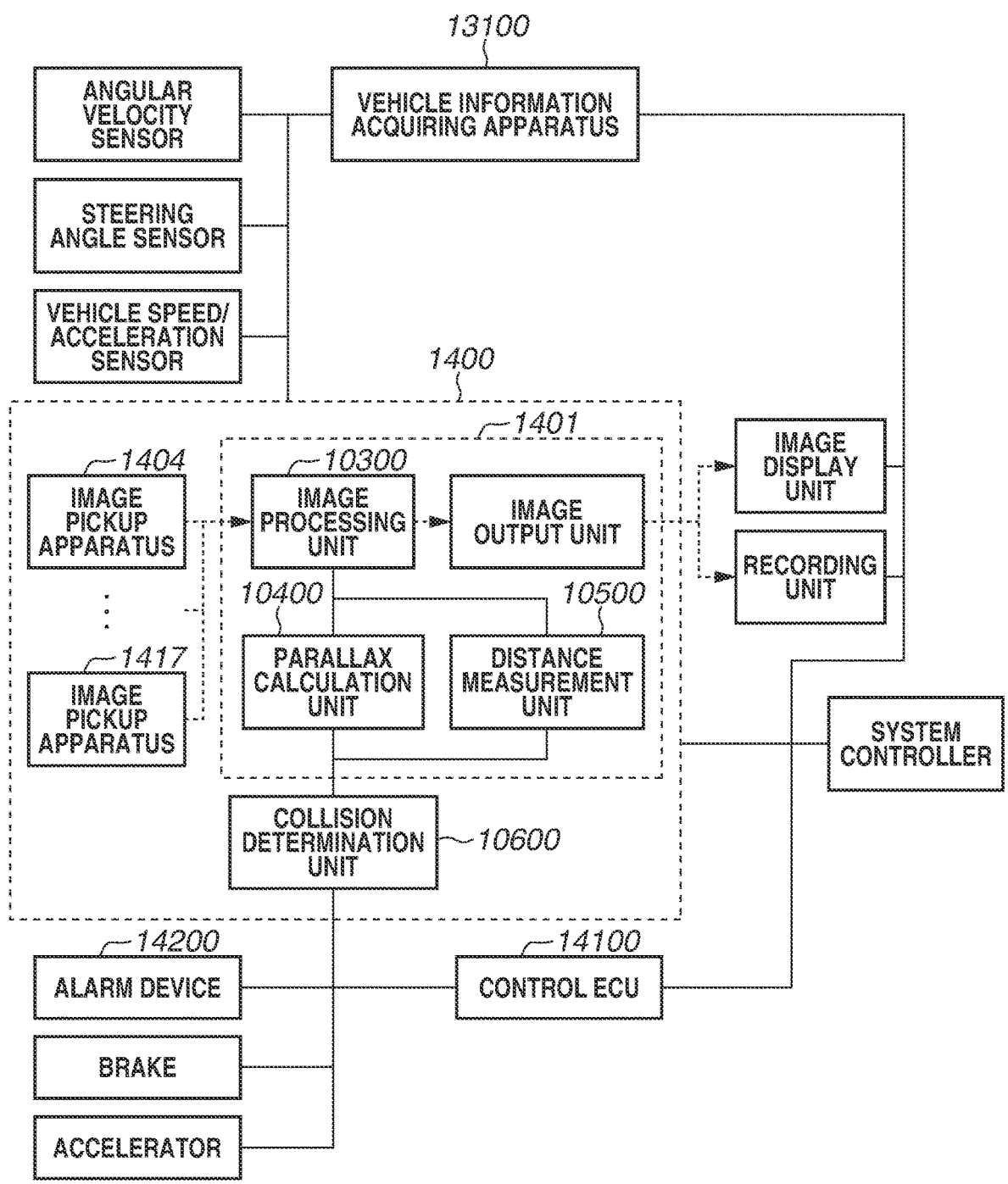
FIGS. 14A and 14B are diagrams each illustrating a moving body including an image pickup system according to at least a fifth exemplary embodiment.
Figure 14B:
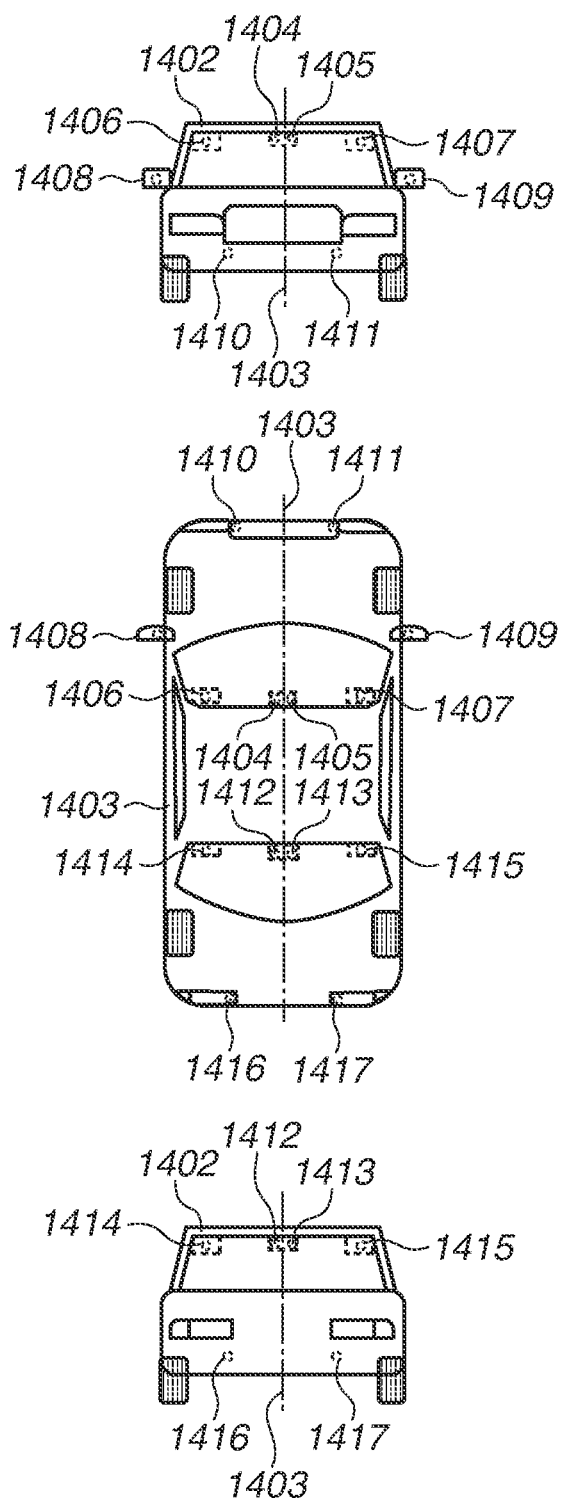

A fifth exemplary embodiment is described below. FIGS. 14A and 14B are diagrams each illustrating an example in which the image pickup system according to the exemplary embodiment of the present disclosure is mounted on a vehicle.

FIG. 14A illustrates a block diagram of the image pickup system according to the present disclosure mounted on a vehicle.

In the fifth exemplary embodiment, an image pickup system 1400 is an image pickup system includes a focusing pixel and an image pickup pixel according to an exemplary embodiment of the present disclosure. The image pickup system 1400 includes an image processing unit 10300 that performs image processing on a plurality of pieces of image data acquired by image pickup apparatuses 1404 to 1417. In addition, the image pickup system 1400 includes a parallax calculation unit 10400 that calculates parallax (a phase difference of parallax images) from the plurality of pieces of image data acquired by the image pickup system 1400. Furthermore, the image pickup system 1400 includes a distance measurement unit 10500 and a collision determination unit 10600. The distance measurement unit 10500 calculates a distance to an objective, based on the calculated parallax, and the collision determination unit 10600 determines whether there is possibility of collision, based on the calculated distance. Here, the parallax calculation unit 10400 and the distance measurement unit 10500 are examples of a distance information acquiring unit that acquires information of distance to an objective. In other words, the distance information is information relating to parallax, a de-focusing amount, a distance to an objective, and the like. The collision determination unit 10600 may use any of the distance information to determine the collision possibility. The distance information acquiring unit may be realized by a hardware exclusively designed, a software module, or a combination thereof. In addition, the distance information acquiring unit may be realized by a field programmable gate array (FPGA), application specific integrated circuit (ASIC), or the like.

The image pickup system 1400 is connected to a vehicle information acquiring apparatus 13100, and acquires vehicle information such as vehicle speed, yaw rate, and a steering angle. Further, the image pickup system 1400 is connected to a control electric control unit (ECU) 14100. The control ECU 14100 outputs a control signal generating braking force to the vehicle, based on the determination result of the collision determination unit 10600. Furthermore, the image pickup system 1400 is also connected to an alarm device 14200 that raises alarm to a driver, based on the determination result of the collision determination unit 10600. For example, in a case where the collision possibility is high as a result of the determination by the collision determination unit 10600, the control ECU 14100 controls the vehicle by applying a brake, returning the accelerator, suppressing engine output, and the like in order to avoid collision and reduce damage. For example, the alarm device 14200 sounds an alarm, displays alarm information on a screen of a car navigation system, or provides oscillation to a sheet belt or a steering, thereby giving caution to a user.

In the fifth exemplary embodiment, an image of surroundings of the vehicle, for example, an image of front side or rear side of the vehicle is picked up by the image pickup system 1400. FIG. 14B illustrates an installation example of the image pickup system on the front side and the rear side of the vehicle.

First and second image pickup apparatuses 1404 to 1417 are disposed around a vehicle 1402. A traveling direction of a vehicle 1402 or a center line 1403 of an outer shape (for example, a vehicle width) of the vehicle 1402 is regarded as a symmetrical axis, and a pair of the first and second image pickup apparatuses may be disposed to be line symmetrical to the symmetrical axis. Such arrangement is preferable for measurement of a distance between the vehicle 1402 and a photographic subject and determination of collision possibility.

In addition, the first and second image pickup apparatuses may be preferably disposed so as not to disturb a field of view of a driver when the driver visually recognizes the situation outside the vehicle 1402.

As for the arrangement of the first and second image pickup apparatuses, a pair of first and second image pickup apparatuses 1404 and 1405, a pair of first and second image pickup apparatuses 1406 and 1407, a pair of first and second image pickup apparatuses 1408 and 1409, and a pair of first and second image pickup apparatuses 1410 and 1411 are exemplified in the case of the front side of the vehicle. Further, in the case of the rear side, a pair of first and second image pickup apparatuses 1412 and 1413, a pair of first and second image pickup apparatuses 1414 and 1415, and a pair of first and second image pickup apparatuses 1416 and 1417 are exemplified.

Further, the control to prevent collision with other vehicles has been described above; however, the image pickup system is applicable to control to automatically drive the vehicle following another vehicle, control to automatically drive the vehicle while preventing the vehicle from deviating from a traveling lane, and other controls. Further, the image pickup system is applicable to, for example, ships, aircrafts, and moving bodies (moving apparatuses) such as industrial robots without limitation to vehicles such as automobiles and railways. In addition, the image pickup system is applicable to an apparatus such as an intelligent transport system (ITS), which widely uses object recognition, without limitation to moving bodies.

Other Exemplary Embodiments

The matters described in the respective exemplary embodiments may be mutually replaceable between the exemplary embodiments.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-203167, filed Oct. 15, 2016, which is hereby incorporated by reference herein in its entirety.

What is claimed is:
1. An image pickup system, comprising:
   a first image pickup apparatus;
   a second image pickup apparatus; and
   a signal processing unit configured to process signals acquired from the first image pickup apparatus and the second image pickup apparatus, wherein
   an exposure period of the first image pickup apparatus is repeated a plurality of times for each pixel row in the one frame,
   an exposure period of the second image pickup apparatus is repeated a plurality of times for each pixel row in the one frame,
   the exposure period of the first image pickup apparatus is overlapped with a non-exposure period of the second image pickup apparatus, and a non-exposure period of the first image pickup apparatus is overlapped with the exposure period of the second image pickup apparatus, and
   the signal processing unit acquires information of a distance to a subject, from the signals acquired from the first image pickup apparatus and the second image pickup apparatus.

2. The image pickup system according to claim 1, wherein the exposure period of the first image pickup apparatus is different in length from the exposure period of the second image pickup apparatus.

3. The image pickup system according to claim 1, wherein the exposure period of the first image pickup apparatus is overlapped with the exposure period of the second image pickup apparatus.

4. The image pickup system according to claim 1, wherein the exposure period of the first image pickup apparatus is not overlapped with the exposure period of the second image pickup apparatus.

5. The image pickup system according to claim 1, wherein the non-exposure period of the first image pickup apparatus is not overlapped with the non-exposure period of the second image pickup apparatus.

6. The image pickup system according to claim 1, wherein the non-exposure period of the second image pickup apparatus corresponds to the exposure period of the first image pickup apparatus, and the non-exposure period of the first image pickup apparatus corresponds to the exposure period of the second image pickup apparatus.

7. The image pickup system according to claim 1, wherein a first period in which the exposure period of the first image pickup apparatus is overlapped with the exposure period of the second image pickup apparatus is longer than a second period in which the non-exposure period of the first image pickup apparatus is overlapped with the exposure period of the second image pickup apparatus and a third period in which the non-exposure period of the second image pickup apparatus is overlapped with the exposure period of the first image pickup apparatus.

8. The image pickup system according to claim 1, wherein the exposure period of the first image pickup apparatus corresponds to an opening period of a mechanical shutter included in the first image pickup apparatus, and the exposure period of the second image pickup apparatus corresponds to an opening period of a mechanical shutter included in the second image pickup apparatus.

9. The image pickup system according to claim 1, wherein
   each of the first image pickup apparatus and the second image pickup apparatus further includes a plurality of pixels two-dimensionally arranged, and
   each of the plurality of pixels includes a photoelectric conversion portion and a charge holding portion configured to hold electric charges transferred from the photoelectric conversion portion.

10. The image pickup system according to claim 9, wherein a start and an end of the exposure period of the first image pickup apparatus are performed collectively for the plurality of pixels.

11. The image pickup system according to claim 9, wherein a start and an end of the exposure period of the second image pickup apparatus are performed collectively for the plurality of pixels included in the second image pickup apparatus.

12. The image pickup system according to claim 9, wherein the charge holding portion includes a first charge holding portion and a second charge holding portion, each of the plurality of pixels includes a first transfer switch and a second transfer switch, the first transfer switch being configured to transfer electric charges from the photoelectric conversion portion to the first charge holding portion, and the second transfer switch being configured to transfer electric charges from the photoelectric conversion portion to the second charge holding portion, and electric charges are transferred from the photoelectric conversion portion to the first charge holding portion a plurality of times in a first frame, and electric charges are transferred from the photoelectric conversion portion to the second charge holding portion a plurality of times in a second frame that is different from the first frame.

13. A moving body comprising:

the image pickup system according to claim 1;

a distance information acquiring unit configured to acquire information of a distance to an objective, from a parallax image based on the signals acquired from the first image pickup apparatus and the second image pickup apparatus; and a control unit configured to control the moving body, based on the distance information.

* * * * *